United States Patent
Ando

(10) Patent No.: US 11,496,506 B2
(45) Date of Patent: Nov. 8, 2022

(54) PROGRAM GENERATION METHOD AND ELECTRONIC CONTROL UNIT FOR CHANGING IMPORTANCE OF FUNCTIONS BASED ON DETECTED OPERATION STATE IN A VEHICLE

(71) Applicant: DENSO CORPORATION, Kariya (JP)

(72) Inventor: Motonori Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 16/016,736

(22) Filed: Jun. 25, 2018

(65) Prior Publication Data
US 2019/0007446 A1    Jan. 3, 2019

(30) Foreign Application Priority Data

Jul. 3, 2017 (JP) .............................. JP2017-130197
Oct. 13, 2017 (JP) .............................. JP2017-199805

(51) Int. Cl.
*G06F 21/55* (2013.01)
*G06F 21/00* (2013.01)
(Continued)

(52) U.S. Cl.
CPC .......... *H04L 63/1441* (2013.01); *G06F 21/54* (2013.01); *G06F 21/606* (2013.01);
(Continued)

(58) Field of Classification Search
CPC . H04L 63/1408; H04L 63/1441; H04L 9/002; H04L 9/3226; H04L 2209/84; G06F 21/54; G06F 21/606
(Continued)

(56) References Cited

U.S. PATENT DOCUMENTS 6,871,341 B1 * 3/2005 Shyr ..................... G06F 8/4441
                                                        712/227
7,577,992 B2    8/2009 Abadi et al.
(Continued)

FOREIGN PATENT DOCUMENTS

CN    110582430 A  * 12/2019 ............. B60R 16/02
EP    2 256 659 A1    12/2010
(Continued)

OTHER PUBLICATIONS

Abadi et al., "Control-Flow Integrity: Principles, Implementations, and Applications," ACM Conference on Computer and Communications Security, Nov. 7-11, 2005, Alexandria, VA, USA, pp. 340-353. (Discussed on p. 2 of the specification).
(Continued)

*Primary Examiner* — Haresh N Patel
(74) *Attorney, Agent, or Firm* — Posz Law Group, PLC

(57) ABSTRACT

A program generation method includes extracting a control flow that represents a call/return relationship between functions as well as extracting the functions themselves from a program code, determining an importance of the extracted functions; and inserting an instruction into the program code, to properly perform the control flow based on the importance of the extracted functions. Overhead that occurs during an execution of the program execution is reducible by using control flow integrity (CFI) technique that does not depend on domains.

32 Claims, 17 Drawing Sheets

(51) Int. Cl.
*H04L 9/40* (2022.01)
*G06F 21/60* (2013.01)
*G06F 21/54* (2013.01)
*H04L 9/00* (2022.01)
*H04L 9/32* (2006.01)
*G06F 11/00* (2006.01)

(52) U.S. Cl.
CPC .......... *H04L 9/002* (2013.01); *H04L 9/3226* (2013.01); *H04L 63/1408* (2013.01); *H04L 2209/84* (2013.01)

(58) Field of Classification Search
USPC .......................................................... 726/22
See application file for complete search history.

(56) References Cited

U.S. PATENT DOCUMENTS

| | | | |
|---|---|---|---|
| 9,361,102 | B2 | 6/2016 | Tan et al. |
| 9,753,731 | B1* | 9/2017 | Puzovic ............ G06F 9/30181 |
| 2001/0013094 | A1 | 8/2001 | Etoh et al. |
| 2007/0255980 | A1 | 11/2007 | Endo et al. |
| 2009/0282477 | A1* | 11/2009 | Chen .................. G06F 21/51 726/22 |
| 2010/0023926 | A1 | 1/2010 | Sugawara ............ G06F 8/458 717/120 |
| 2011/0095909 | A1* | 4/2011 | Kushi .................. G08G 1/161 340/905 |
| 2011/0283256 | A1* | 11/2011 | Raundahl Gregersen .................. G06F 8/656 717/108 |
| 2012/0096448 | A1* | 4/2012 | Doyle .................. G06F 8/4441 717/159 |
| 2013/0283245 | A1* | 10/2013 | Black ................ G06F 9/44589 717/130 |
| 2014/0082597 | A1* | 3/2014 | Chafi ...................... G06F 8/443 717/148 |
| 2014/0101642 | A1* | 4/2014 | Morrison .................. G06F 8/44 717/140 |
| 2014/0123281 | A1* | 5/2014 | Fischer ............... G06F 9/30145 726/23 |
| 2014/0372995 | A1* | 12/2014 | Mori ...................... G06F 8/452 717/146 |
| 2015/0128123 | A1* | 5/2015 | Eling ..................... G06F 8/656 717/171 |
| 2016/0259644 | A1* | 9/2016 | Brandt ............... G06F 9/30145 |
| 2017/0212746 | A1* | 7/2017 | Quin ..................... H04L 67/12 |
| 2017/0249460 | A1* | 8/2017 | Lipton ................. G06F 21/602 |
| 2017/0261947 | A1* | 9/2017 | Koga ................... B60W 40/09 |
| 2017/0352215 | A1* | 12/2017 | Maiwand ........... G07C 9/00309 |
| 2018/0037160 | A1* | 2/2018 | Sakai ..................... B60Q 1/143 |
| 2018/0247045 | A1* | 8/2018 | David .................... H04L 67/12 |
| 2018/0341767 | A1* | 11/2018 | Basak .................. G06F 12/126 |

FOREIGN PATENT DOCUMENTS

| | | | | |
|---|---|---|---|---|
| JP | 2006-106939 | A | | 4/2006 |
| JP | 2011-081501 | A | | 4/2011 |
| JP | 2011-123658 | A | | 6/2011 |
| JP | 6270965 | B1 | * | 1/2018 ............ G06F 8/65 |
| KR | 101600460 | B1 | * | 3/2016 ........... G06F 11/362 |
| WO | WO-0002106 | A1 | * | 1/2000 ........... G06F 11/362 |

OTHER PUBLICATIONS

U.S. Appl. No. 16/016,746, filed Jun. 25, 2018, Ando.
Tominaga et al., "Mimicry Attack Detection by Saving and Checking Control Data Stored on Call Stack"; 2012 Information Processing Society of Japan, vol. 53 No.9, Sep. 15, 2012, p. 2075~p. 2085.
Shibata et al. "Adaptive Protection Mechanism Using Obfuscation Compliler", The Institute of Electronics, Information and Communication Engineers, vol. 109 No. 168, Jul. 28, 2009, p. 43~p. 48.

* cited by examiner

| FUNCTION | FUNCTIONALITY | IMPORTANCE |
|---|---|---|
| A | MAIN FUNCTION | — |
| B | SHIFT POS DETECTION | LO |
| C | DOOR OPEN CONTROL | HI |
| D | LED "P" LIGHT ON INST. | MID |

| FUNCTION | FUNCTIONALITY | PARK TIME IMPORTANCE | STOP TIME IMPORTANCE | TRAVEL TIME IMPORTANCE |
|---|---|---|---|---|
| A | MAIN FUNCTION | — | — | — |
| B | SHIFT POS DETECTION | MID | LO | LO |
| C | DOOR OPEN CONTROL | HI | HI | HI |
| D | LED "P" LIGHT ON INST. | MID | MID | HI |

FIG. 19
| FUNCTION | FUNCTIONALITY | IMPORTANCE |
|---|---|---|
| A | EMERGENCY BRAKE OP | HI |
| B | HZD SW STATE DETECTION | LO |
| C | HZD LIGHT ON | MID |
FIG. 20
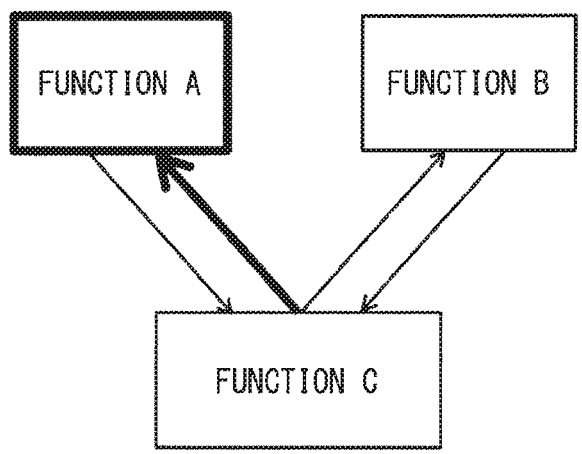
FIG. 21
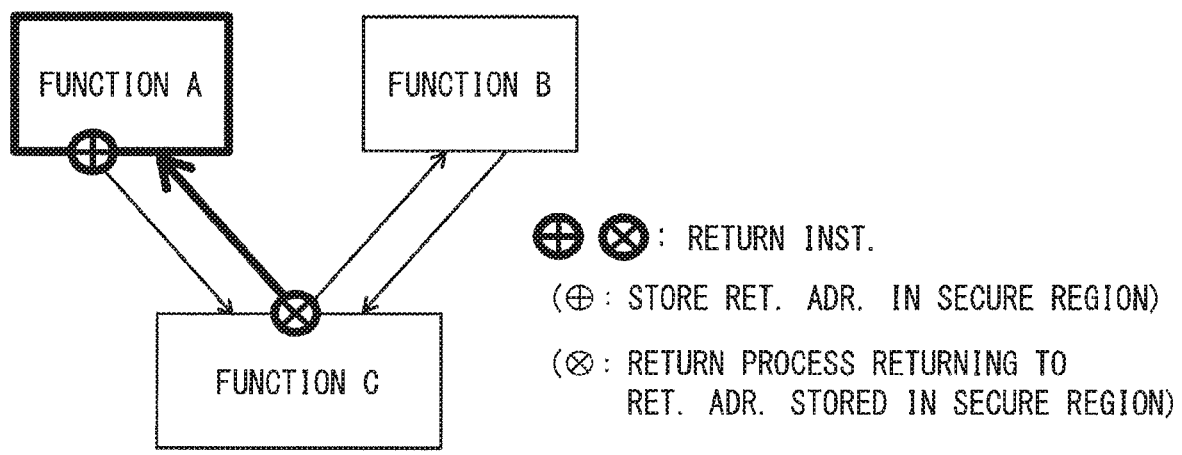
⊕ ⊗ : RETURN INST.
(⊕ : STORE RET. ADR. IN SECURE REGION)
(⊗ : RETURN PROCESS RETURNING TO RET. ADR. STORED IN SECURE REGION)

FIG. 23A
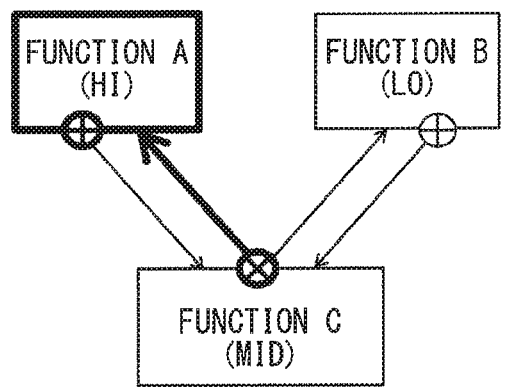
FIG. 23B
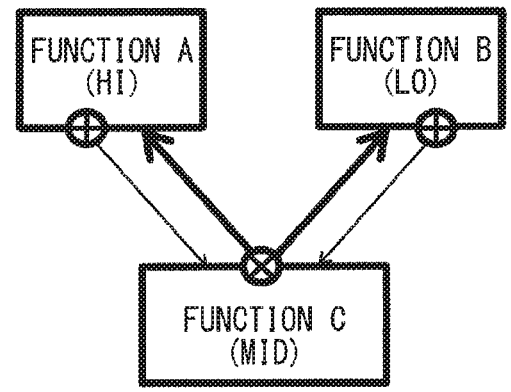
FIG. 24
| FUNCTION | FUNCTIONALITY | HI SPD TRAVEL IMPORTANCE | LO SPD TRAVEL IMPORTANCE |
|---|---|---|---|
| A | EMERGENCY BRAKE OP. | HI | MID |
| B | HZD SW STATE DETECTION | MID | LO |
| C | HZD LIGHT ON | HI | MID | ns
PROGRAM GENERATION METHOD AND ELECTRONIC CONTROL UNIT FOR CHANGING IMPORTANCE OF FUNCTIONS BASED ON DETECTED OPERATION STATE IN A VEHICLE

CROSS REFERENCE TO RELATED APPLICATION

The present application is based on and claims the benefit of priority of Japanese Patent Applications No. 2017-130197, filed on Jul. 3, 2017, and No. 2017-199805, filed on Oct. 13, 2017, the disclosures of which are incorporated herein by reference.

TECHNICAL FIELD

The present disclosure generally relates to a program generation method and an electronic control unit implementing such program. Specifically, how a program that is resistant to and/or tolerant of a buffer overflow attack is generated, which may be more specifically applicable to an in-vehicle system environment.

BACKGROUND INFORMATION

A buffer overflow attack is generally known as an attack in which an attacker's program is sent into a memory (e.g., memory stack) of a program that is currently in execution, which leads to an execution of such malicious program, and results in a deprivation of system control from a legitimate controller and/or program. More practically, the attacker's program may change a return address of the executed program in the stack, to obtain control to the attacker's program, for the deprivation of the system control.

Even though various resolution and countermeasure methods have already been proposed for coping with the buffer overflow attack, one of which is a control flow integrity technique or a "CFI" technique that checks a call and return address involving a call/return from one function to the other function based on the program code. The CFI technique permits such a call/return (i.e., performs a call/return process) only when an identification of a caller function or a return destination function is legitimate, meaning that, even after allowing the attacker to modify the return address, modification of the return address by the attacker is detectable before actually causing damage. However, such a check process in the CFI technique, during an execution of the program, is time consuming.

For resolution of such an issue, patent document 1, i.e., Japanese Patent No. 2011-8778 proposes, for example, a storage of a program instruction in a specific region of a storage (i.e., a memory) and masking of a target jump/return address of a jump/return process, which prevents and/or limits the attacker to simply modify the jump/return address for meaningfully overtaking a current operation/process without causing an increased overhead by the check process for checking the jump/return address.

Further, according to patent document 2, i.e., Japanese Patent No. 2011-123658 while reducing a time-related overhead and a spatial (i.e., memory address) overhead, an efficient address check is enabled in consideration of an inter-domain execution restriction/limitation when a function call and a function return are performed to and from (i.e., between) a non-trusted domain or domains.

Furthermore, non-patent literature document 1, i.e., Martin Abadi, Mihai Budiu, Ulfar Erlingsson, and Jay Ligatti, "Control-flow integrity", ACM Conference on Computer and Communication Security, November 2005, pp. 340-353 discloses a "Shadow call stack", or a protected area/region of a memory, which stores a return address of a function/function call, for dispensing a return address ID check and for guaranteeing a return to a legitimate caller, i.e., to a calling function or the like.

In view of all of the above, the present disclosure is advantageous due to the following reasoning. That is, the methods described in patent document 1 are not directly applicable to the conventional CFI technique, because such methods are different from the conventional CFI technique.

With regard to patent document 2, a function call/return within the non-trusted domain(s) is not included in the scope of checking, which may allow an execution of an unintended instruction string (i.e., not intended by the programmer/systems engineer) or the like within the non-trusted domain(s) by an inappropriate function call/return.

Further, the approach proposed by the non-patent literature document 1 causes a considerable and drastic increase in overhead due to a storage of all return addresses in the Shadow call stack region of the memory.

SUMMARY

It is an object of the present disclosure to prevent overhead or an increase in overhead of the check process during program execution by using a CFI technique that does not depend on domains. That is, the CFI technique of the present disclosure checks a call-return relationship between two functions regardless of whether the functions belong to trusted or untrusted domains.

In one aspect of the present disclosure, a program generation method includes: extracting a control flow that represents a call/return relationship between functions, as well as extracting the functions themselves from a program code; determining an importance of the extracted functions; and inserting an instruction into the program code to properly perform the control flow based on the importance of the functions.

According to the program generated by the program generation method of the present disclosure, and according to the electronic control unit implementing such a program generation method, overhead may be reduced during the execution of the program by using the CFI technique without relying on the domain.

BRIEF DESCRIPTION OF THE FIG.S

Objects, features, and advantages of the present disclosure will become more apparent from the following detailed description made with reference to the accompanying drawings, in which:

FIG. 19 is a diagram of a risk rank table used in the program generation method in the fourth embodiment of the present disclosure;

FIG. 20 is an illustration of a determination step of the program generation method in the fourth embodiment of the present disclosure;

FIG. 21 is an illustration of an insertion step of the program generation method and a configuration of a generated program in the fourth embodiment of the present disclosure;

FIG. 23A is an illustration of a configuration of a generated program by the program generation method in the fourth embodiment of the present disclosure;

FIG. 23B is another illustration of a configuration of a generated program by the program generation method in the fourth embodiment of the present disclosure; and FIG. 24 is another diagram of the risk rank table used in the program generation method in the fourth embodiment of the present disclosure.

DETAILED DESCRIPTION

Hereafter, with reference to the accompanying drawings, the present disclosure regarding a program generation method, and a configuration and functions of an electronic control unit implementing such a program are described.

The configuration of each of the embodiments described herein is non-limiting and open to a combination with other embodiments, unless otherwise indicated.

Although the following exemplary embodiments describe an in-vehicle electronic control unit used in a vehicle and a program executable by the electronic control unit, the electronic control unit and the program may be applicable for other purposes and implemented in other places.

(Configuration Shared by all Embodiments)

Figure 1:
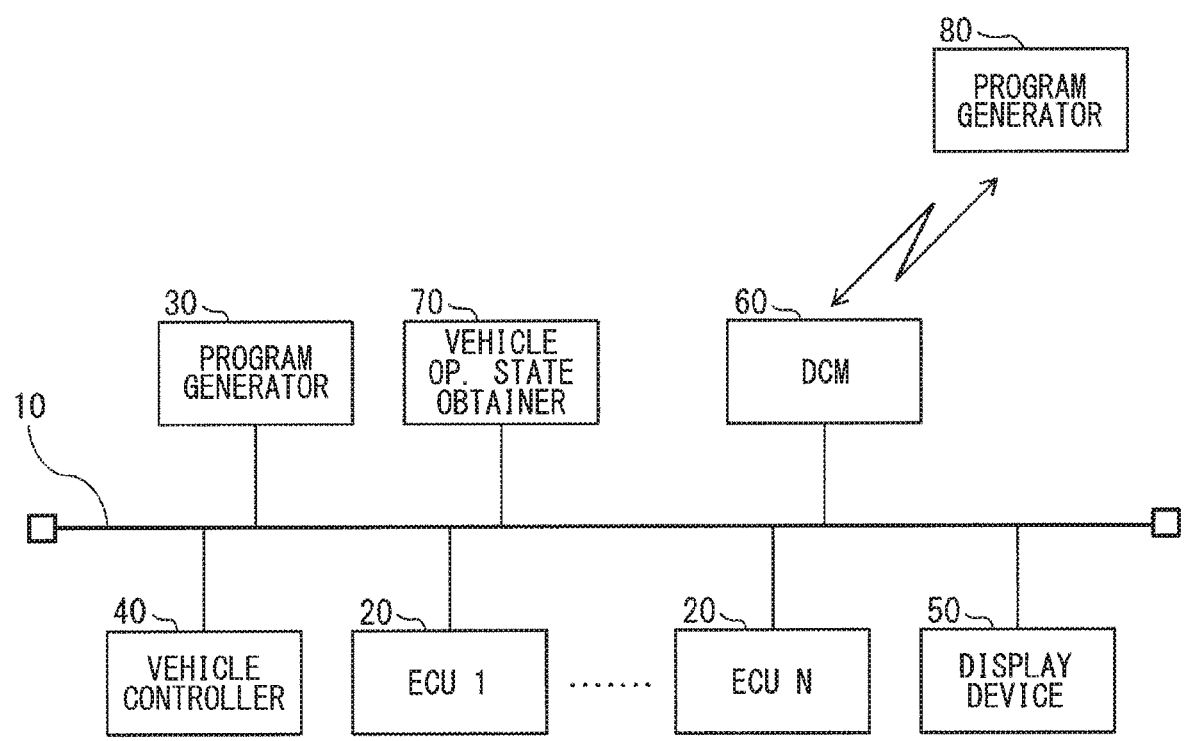
FIG. 1 is a block diagram of an in-vehicle network with an electronic control unit and other devices used to implement a program generation method in a first embodiment of the present disclosure.

FIG. 1 shows a configuration, i.e., an arrangement of a network of devices, to serve as a base in each of the embodiments. That is, in an in-vehicle network 10 of an automobile, many devices such as N pieces of electronic control units (ECU) 20, a program generator 30, a vehicle controller 40, a display device 50, a data communication module (DCM) 60, a vehicle operation state obtainer 70 are disposed and connected. Note that the program generator 30 may be stationarily connected to the network 10, or may be connected thereto as required or on demand by using a connector and a cable. Further, the program generator 30 may be replaced with a program generator 80 that is connectable to the network 10 wirelessly via the data communication module 60, either stationarily or as required.

First Embodiment

1. A Program Generation Method and a Program Generated by Such Method (i.e., Subject Program)

Figure 2:
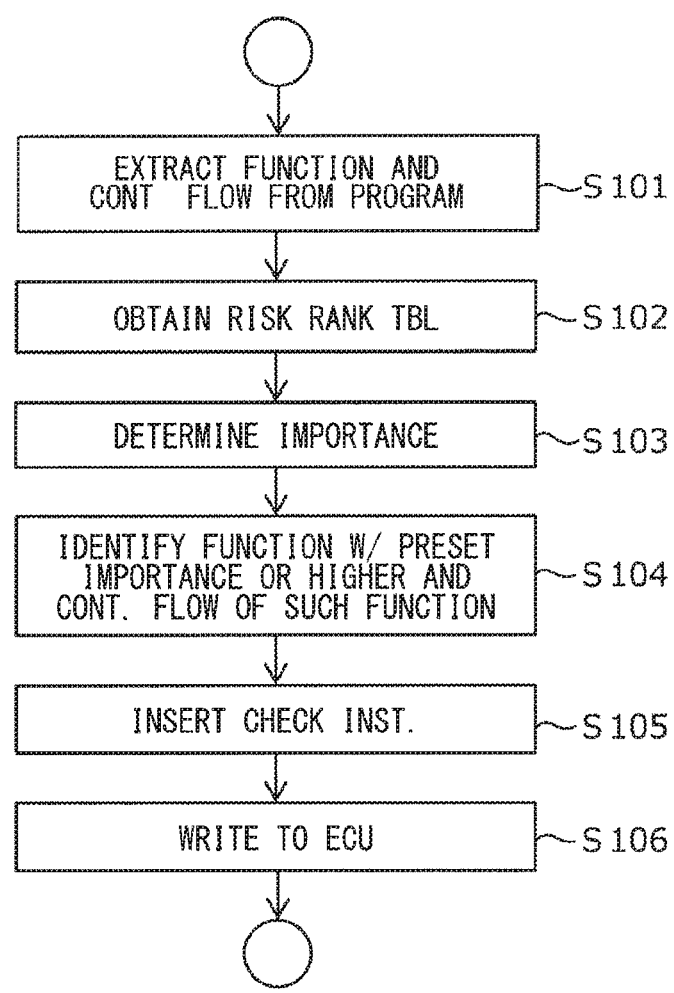
FIG. 2 is a flowchart regarding each step of the program generation method in the first embodiment of the present disclosure.

FIG. 2 is a flowchart of a program generation method described in the present embodiment. Each step of the flowchart describing a flow of control as a whole is described with reference to FIGS. 3 to 6. Note that the program generation method is performed by the program generator 30 or the program generator 80, which may be a general-purpose device or a dedicated, specific device having a processor (e.g., CPU) and a memory. The program generation method may also be performed by or within the electronic control unit (ECU) 20, or like devices, to which the generated program is written.

First, a "function" used in a "program code" of a program that is written to the electronic control unit 20 and a control flow representing a call/return relationship of the "function" are extracted. The program described above may be, for example, a control, or a control logic, for (i) detection of a shift position (or gearshift position) of a vehicle, and (ii) display of a P position (Parking) on an instrument panel and a door opening during a door unlock permission state, when the shift position is in P (Parking) position.

The "program code" described above in the present disclosure may be a computer program written in machine language, assembly language, a high level language, or the like. The program code or computer program may be embedded or stored on a non-transitory physical computer-readable medium and comprise instructions that may be executed by a computer to perform functions, methods, and processes.

The "function" described above in the present disclosure may be either a function within the computer language itself (i.e., a subroutine), or a method in general.

Figures 3, 4:
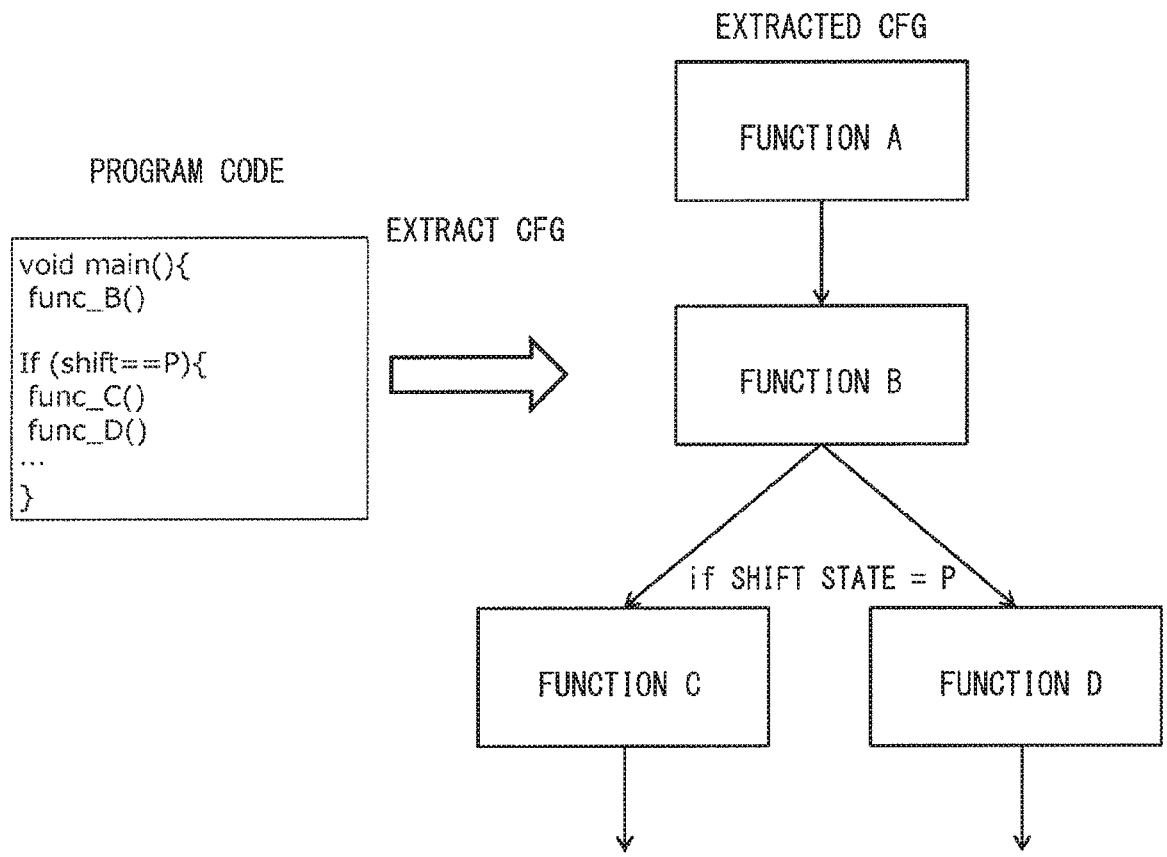
FIG. 3 is an illustration of an extraction step of the program generation method in the first embodiment of the present disclosure.
FIG. 4 is a diagram of a risk rank table used in the program generation method in the first embodiment of the present disclosure.

FIG. 3 illustrates functions and a control flow extracted from the program code as a control flow graph (CFG). In the example of FIG. 3, function A thru function D, together with a control flow representing a call/return relationship of each of the extracted functions, are illustrated. More specifically, a relationship between function B and functions C and D is a call/return relationship in case that a shift lever of a vehicle is put in P position (Parking) ("if SHIFT STATE=P" in FIG. 2).

Returning now to FIG. 2, a risk rank table, i.e., a list of different "importance" levels for each of those functions used in the program code (as shown in FIG. 4), is obtained (S102).

The "importance" in the present disclosure is an index of classification based on a predetermined evaluation standard, and the number of classifications, i.e., levels, may be two or more.

More specifically, the importance may be, for example, an importance in view of how frequent a subject function is used, which may be set "according to" a "frequency of use" of a function.

The "frequency of use" in the present disclosure may be, for example, how frequently a subject function is used, or may also be a total execution time of the subject function, a use ratio of the subject function, or the like.

Further, "according to" in the present disclosure may mean a direct or indirect relationship.

The importance may also be a functional importance (i.e., importance from a viewpoint of the function), for example. That is, an importance may be defined "based on" user safety for a vehicle user/occupant, if the program code is written to an ECU disposed in a vehicle and the subject function in the program code involves or affects the user safety.

More practically, the importance may have three levels, as shown in FIG. 4, among which (i) HI (i.e., high) importance may be set to a function, when malfunctioning of the subject function exposes the vehicle user to a safety hazard, (ii) MID (i.e., middle) importance may be set to a function, when malfunctioning of the subject function causes discomfort to the vehicle user, and (iii) LO (i.e., low) importance may be set to a function, when malfunctioning of the subject function is barely noticeable to the vehicle user.

In addition, the importance may further be enhanced to represent data importance, when a certain function handles data with various levels of importance. More practically, when a function handles personal information, vehicle information, travel information, or other information, such function when handling one of those data may either have a level 1, 2, 3, or 4 importance assigned thereto, for example.

FIG. 4 is an example of the risk rank table in the present embodiment. From among the functions extracted and illustrated in FIG. 3, function A is a main function, function B is a shift "P" state detection function, function C is a door open control function, and function D is an LED "P(arking)" light ON instruction function. The importance of each of those functions may be evaluated in terms of an influence on user safety when the program is attacked, which may cause a call initiated by an abnormal flow, i.e., a flow other than the normal control flow. Function A does not have a set importance in terms of user safety described above, since function A is always executed as a "main path" of the program. Function B has LO importance, since a call of function B (i.e., shift "P" state detection function) in other control flow simply returns NG (Not P) determination internally, when the shift position set by the user is in a position other than P, thereby the user barely notices such a determination. Function C has HI importance, since the user may be exposed to a safety hazard (=door open in a traveling vehicle) when door open control is performable while a vehicle is traveling, i.e., when the shift position is other than P. Function D has MID importance, since the user may be annoyed or confused (i.e., user discomfort) by seeing LED "P" light turned on when the shift position is not actually in "P(arking)".

The risk rank table may be provided as a database in a device which implements the program generation method, or may be provided as a database outside thereof. Further, when the database is outside of the device, the entire risk rank table may be obtained from outside of the device, or the risk rank table may be partially obtained only for the extracted functions at S101.

Then, the "importance" of the function extracted at S101 is determined based on the function extracted at S101 and the risk rank table obtained at S102. More specifically, it is determined that function B has LO importance, function C has HI importance, and function D has MID importance. Note that, in the present disclosure, use of the risk rank table for the determination of importance is not required, i.e., is arbitrary, and so is the obtainment of the risk rank table.

Subsequently, an instruction for properly performing the control flow is inserted into the program code "based on" the determined importance. The instruction includes at least one of (i) a check instruction that checks the ID of a caller (i.e., return destination) function or a callee function in a call/return relationship and (ii) a return process function that stores a return address in a secure region and performs a return process based on the return address stored in the secure region. Note that, in the present embodiment and subsequent embodiments (i.e., second and third), the check instruction that checks ID of the function(s) in a call/return relationship is inserted as an instruction. In the present embodiment, a function or functions having an importance of a certain level or higher is/are identified first in the entire program code, then, the control flow involving such high-importance function(s) is identified (S104).

Here, in the present disclosure, "based on" is used in a context of description regarding insertion of the check instruction reflecting the importance of the functions, i.e., such a context may indicate that the importance is directly usable as an index of classification, or that the importance is considered in view of other factors, or that the importance is used after a preset weighting/arithmetic operation. The same applies throughout the description.

Figure 5:
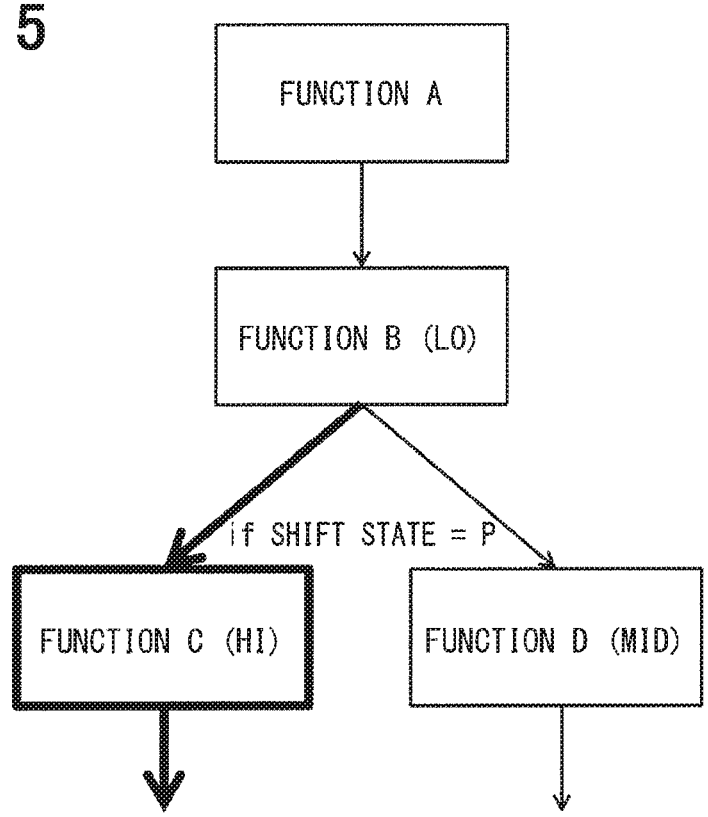
FIG. 5 is an illustration of a determination step of the program generation method in the first embodiment of the present disclosure.

FIG. 5 is an illustration of a control flow as a CFG of the present embodiment, which is identified as a flow of control for the functions having certain importance or higher (i.e., a high-importance function). In the illustration, a thick frame rectangle is a high-importance function, and a thick line arrow is a control flow involving the high-importance function. In the present embodiment, the functions having HI importance or higher and the control flow involving the functions having HI importance or higher are identified. That is, function C is the only function having HI importance, thereby the control flow having function C either as a caller (i.e., return destination) or a callee is identified.

Next, in the present embodiment, the check instruction that checks whether the control flow (i.e., the one identified in S104) is properly performed or performable is inserted in the program code. As used herein, "performed" and "performable" may be understood in some instances as being used in the future tense, because the check has to be performed before the execution of the program. Both performed and performable may be used interchangeably throughout the description.

Figure 6:
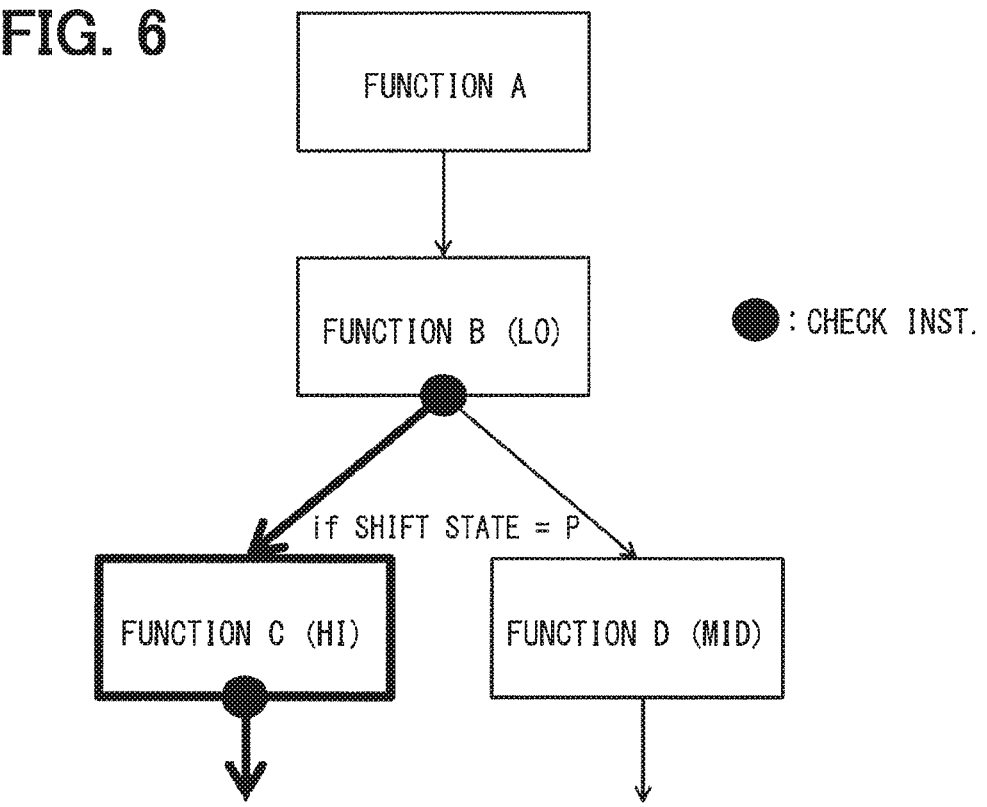
FIG. 6 is an illustration of an insertion step of the program generation method and a configuration of a generated program in the first embodiment of the present disclosure.

FIG. 6 is an illustration of a program into which the check instruction is inserted as a CFG. In the present embodiment, in order to check the control flow involving function C having a high importance, a check instruction is inserted respectively at two positions, i.e., at a position of the large black dot, for performing a flow check process (i) at the time of transition (i.e., control transfer) from function B to function C (i.e., call of function C) and (ii) at the time of transition from function C to another function.

That is, the program (henceforth, the subject program) generated by the program generation method of the present embodiment is a program that includes, in the program code, function A thru function D (i.e., "the function" in the present disclosure) as well as the control flow (i.e., "the control flow" in the present disclosure) representing a call/return relationship of those functions, and, in such program code, the check instruction that checks whether the control flow is properly performable is inserted, "based on" the importance of the function, and such a program is executable by a "computer." That is, the check instruction may check whether the program code is executable based on the extracted control flow.

"Computer" in the present disclosure may be a device at a component level, such as a microcomputer, a module, an ECU or the like, or may also be an apparatus and/or a system, such as a navigation system, a cellular phone, a smart phone, or the like.

The program code or computer program may be embedded or stored on a non-transitory physical computer-readable medium and comprise instructions that may be executed by a computer to perform functions, methods, and processes. For example, the program code or computer program (i.e., "program") may contain an instruction set that when executed, may perform (or control other hardware and software to perform) the algorithms, control flows, functions, processes, and methods described herein and illustrated in the accompanying figures.

Although the importance in the present embodiment is described as an index of user safety, i.e., safety of the vehicle user, the importance may also represent another index, and the importance may be combined with other function evaluation factors.

For example, the control flow related to a main function (i.e., function A) may be included as a subject of the check process. Since the main function is a function inevitably performed at the time of program execution, the importance may be based on other indexing other than the user safety during the use of the vehicle, i.e., use frequency of a function may more suitably be used to determine the importance. Alternatively, other factors other than the user safety may be additionally considered.

As an example of the check instruction, an instruction may compare (i) a correct (i.e., legitimate) call/return destination that is known in advance and (ii) a call/return destination of a program that is going to be executed, and may either (a) execute the program upon seeing an agreement therebetween, or (b) abort the program upon detecting a discrepancy therein. However, the check instruction should not be limited to such control flow.

Finally, the subject program having such a check instruction inserted therein is written to the electronic control unit 20 that implements the subject method (S106).

As described above, when the program generation method of the present embodiment is performed within the electronic control unit 20, this step is skipped.

According to the above-described program generation method, the subject check flow to be checked by the check instruction is limited (i.e., the scope of checking is narrowed), based on the importance, thereby time-related overhead (i.e., a duration of processing time) and/or spatial overhead (i.e., an amount of storage area used by the check process) at the time of program execution are reduced.

2. Electronic Control Unit (ECU) Having the Subject Program

The subject program generated in the above-described manner may be written to an electronic control unit (ECU) that executes such a program, via the in-vehicle network 10 or the DCM 60. The ECU to which the subject program is written and which executes such a program may include, besides including the ECU 20, any one or more of the following, i.e., the vehicle controller 40, the display device 50, the DCM 60, and other information processing devices connected to the in-vehicle network 10. The following description is based on an assumption that the subject program is written to and is executed by the electronic control unit 20.

The configuration of the electronic control unit 20 having the subject program is described with reference to FIG. 7.

The electronic control unit 20 has a central processing unit (CPU) 100 and a memory 110. The subject program is stored in the memory 110. An arithmetic unit 101 (i.e., an "arithmetic unit" in the present disclosure) of the CPU 100 reads and executes the subject program stored in the memory 110. The configuration of the subject program is already described above.

A detector unit 102 (i.e., a "detector unit" in the present disclosure) of the CPU 100 monitors an output of the check instruction performed in the course of execution of the subject program, and detects an abnormality of the control flow. More specifically, it compares the correct (i.e., legitimate) call/return destination that is known in advance with the call/return destination in the subject program that is to be executed, and detects an abnormality or abnormalities based upon whether the two match and are in agreement.

A processor 103 (i.e., a "processor" in the present disclosure) of the CPU 100 performs a "predetermined process" based on the detection result of the detector unit 102. For example, when a detection result shows an abnormality, it stops execution of the subject program. Alternatively, it may notify a user via the display device 50, or may save an execution log of the subject program. When it is difficult to abort the execution of the subject program because of user safety, it may abort and/or reset the program after a safety reservation process, for example, after stopping the vehicle.

Here, the "predetermined process" in the present disclosure may be a fixed and/or preset process, or may also be a conditional/variable process, the contents of which may change depending on the situation.

Figure 8:
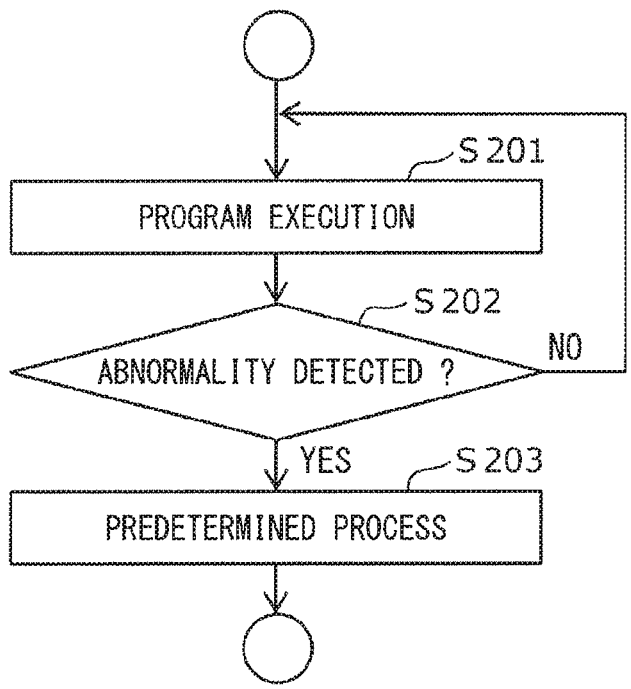
FIG. 8 is a flowchart of an operation of the electronic control unit in the first embodiment of the present disclosure.

Operation of the electronic control unit 20 is described with reference to FIG. 8.

The arithmetic unit 101 of the CPU 100 reads and executes the subject program stored in the memory 110 (S201).

The detector unit 102 of the CPU 100 monitors the output of the check instruction performed in the course of execution of the subject program, and detects any abnormality of the control flow (S202).

When an abnormality is detected, the processor 103 of the CPU 100 performs the "predetermined process," e.g., aborting the subject program or the like (S203). When no abnormality is detected, the processor 103 continues the execution of the subject program, without performing the predetermined process.

In the electronic control unit described above, the subject program written therein limits the control flow subject to checking based on importance, and in such manner, the time-related overhead and spatial overhead at the time of program execution are reduced.

In the electronic control unit for use in a vehicle, by inserting the check instruction based on the importance defined according to the safety of the vehicle user, an overhead in the program execution is effectively reduced without compromising the safety of the vehicle or the user.

Second Embodiment

According to the first embodiment, the check instruction that checks the control flow involving the identified function is inserted, and, once inserted, the check instruction itself may be configured to always perform a check process.

On the other hand, in the present embodiment, the check instruction does not always perform a check process, but the check instruction is configured to selectively perform the check process during the execution of the subject program.

1. A Program Generation Method and a Generated Program by Such Method (i.e., Subject Program)

The program generation method in the present embodiment is fundamentally the same as the first embodiment described with reference to FIG. 2. However, in the present embodiment, the predetermined importance specified at S104 is set to be lower than the one in the first embodiment. For example, the function having LO importance or higher than LO is identified, and the control flow involving the function(s) for such importance level is identified. Then, a check instruction that checks whether a call/return of the function having LO importance or higher than LO is properly performable, is inserted into the program code. For example, based on the risk rank table of FIG. 4, and the function having LO importance or higher than LO is extracted, i.e., function B, function C, and function D are extracted.

Figure 9:
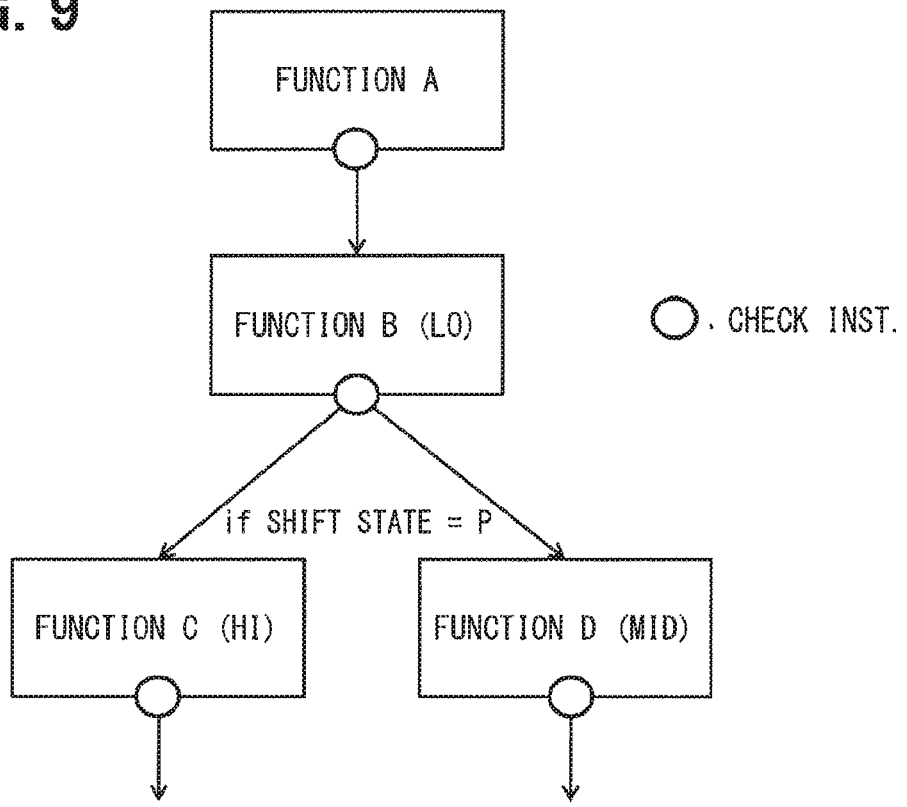
FIG. 9 is an illustration of an insertion step of a program generation method and a configuration of a generated program in a second embodiment of the present disclosure.

Then, as shown in FIG. 9, the control flow having function B, function C, and function D as a call/return destination has a check instruction inserted therein. Note that, in FIG. 9, a white circle represents the inserted check instruction. However, unlike the first embodiment, the inserted check instruction is configured to selectively perform the check process (whether or not to perform the check process is selectable) according to the importance. Details of such selective check process are described in the following.

Note that, in the present embodiment, the check instruction is inserted into the program code for the control flow of the function having a LO importance or higher. However, the control flow of all functions may have the check instruction inserted therein.

The subject program in this case is a program that (i) includes, in the program code, functions A thru D (i.e., the "function" in the present disclosure) and the control flow (i.e., the "control flow" in the present disclosure) that represents a call/return relationship of the functions, and (ii) has the check instruction that is configured to selectively perform the check process according to the importance of the functions, and (iii) is executable by/on a computer.

2. Electronic Control Unit (ECU) Having the Subject Program

Figure 10:
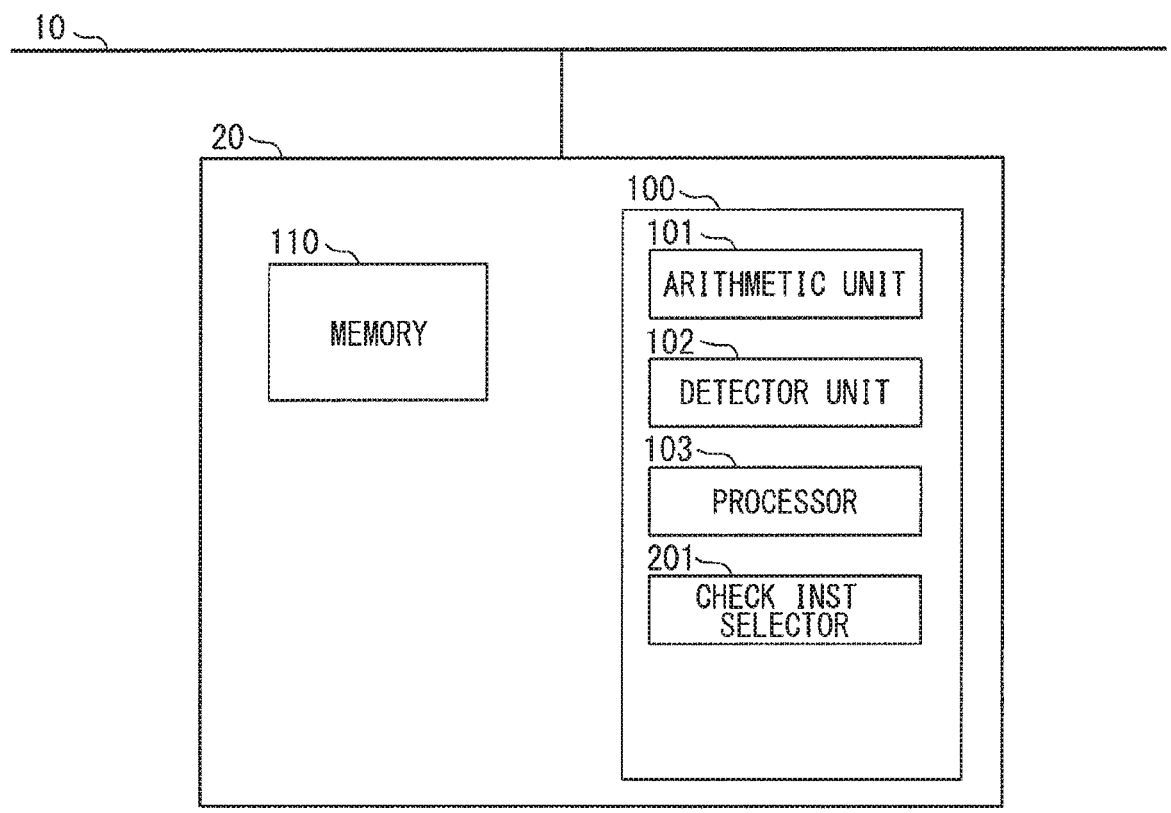
FIG. 10 is a block diagram of an electronic control unit in the second embodiment of the present disclosure.

The configuration of the electronic control unit 20 in the present embodiment is described with reference to FIG. 10. In addition to the configuration of the first embodiment described in FIG. 7, the electronic control unit of the present embodiment has a check instruction selector 201. The check instruction selector 201 determines the importance based on the information input from the external device, i.e., a device external to the ECU 20. The information input from the external device for such determination may be, for example, an input of the importance itself by a vehicle user or the like, or may also be the vehicle speed, the shift (i.e., gear) position, and the like, which is a vehicle behavior or a vehicle's operation state. Details of the vehicle behavior are described in the third embodiment.

Further, the check instruction selector 201 selects, i.e., selectively determines, which one or more of the inserted check instructions in the subject program are to be performed in view of the determined importance, or "based on" the "importance".

Figure 11A:
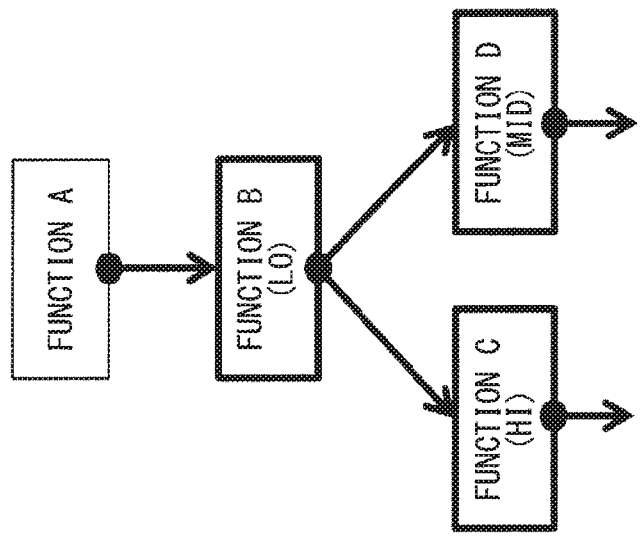
FIG. 11A is an illustration of a configuration of a generated program by the program generation method in the second embodiment of the present disclosure.
Figure 11B:
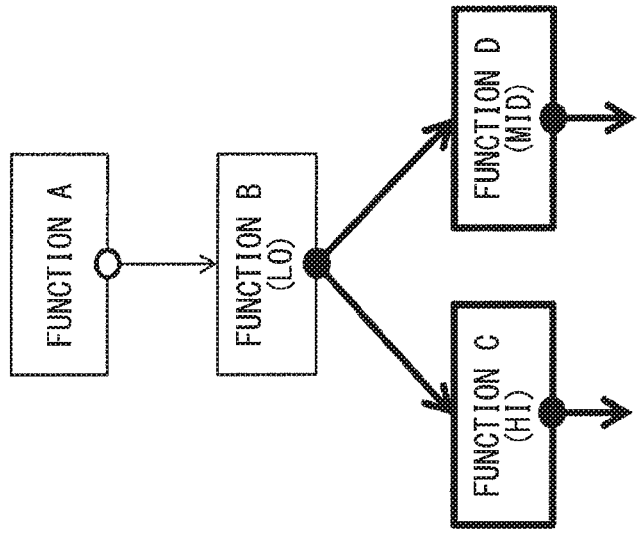
FIG. 11B is another illustration of a configuration of a generated program by the program generation method in the second embodiment of the present disclosure.
Figure 11C:
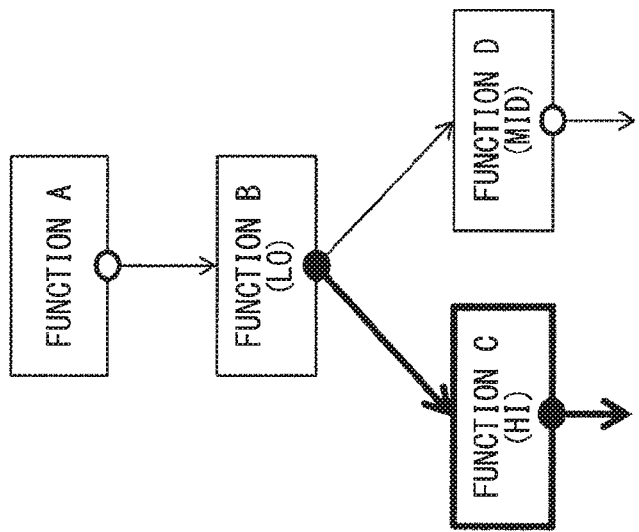
FIG. 11C is yet another illustration of a configuration of a generated program by the program generation method in the second embodiment of the present disclosure.

For example, as shown in FIG. 11A, when the determined importance to be checked is HI (i.e., only HI), since the HI importance function is function C only, the check instruction that only checks (i) the control flow that includes a call from function B to function C, and (ii) the control flow that includes a call from function C to another function is selected. Further, as shown in FIG. 11B, when the determined importance to be checked is MID or higher, since the function D has MID importance, the check instruction that checks, in addition to the control flows shown in FIG. 11A, (i) the control flow that includes a call from function B to function D, and (ii) the control flow that includes a call from function D to other function is selected. Further, as shown in FIG. 11C, when the determined importance to be checked is LO or higher, since function B has LO importance, the check instruction that checks, in addition to the control flows shown in FIG. 11B, the control flow that includes a call from function A to function B is selected. Note that, in FIGS. 11A to 11C, the large black dots respectively represent a selected check instruction to be performed, while the circles represent a non-selected check instruction, which will not be performed (i.e., not selected as a target of processing).

Further, the arithmetic unit 101 executes the subject program including the selected check instructions. For example, if the importance determined by the check instruction selector 201 is HI, the check instructions shown in FIG. 11A are performed, and, if the determined importance is MID, the check instructions shown in FIG. 11B are performed, and, if the determined importance is LO, the check instructions shown in FIG. 11C are performed as a target of processing.

Figure 12:
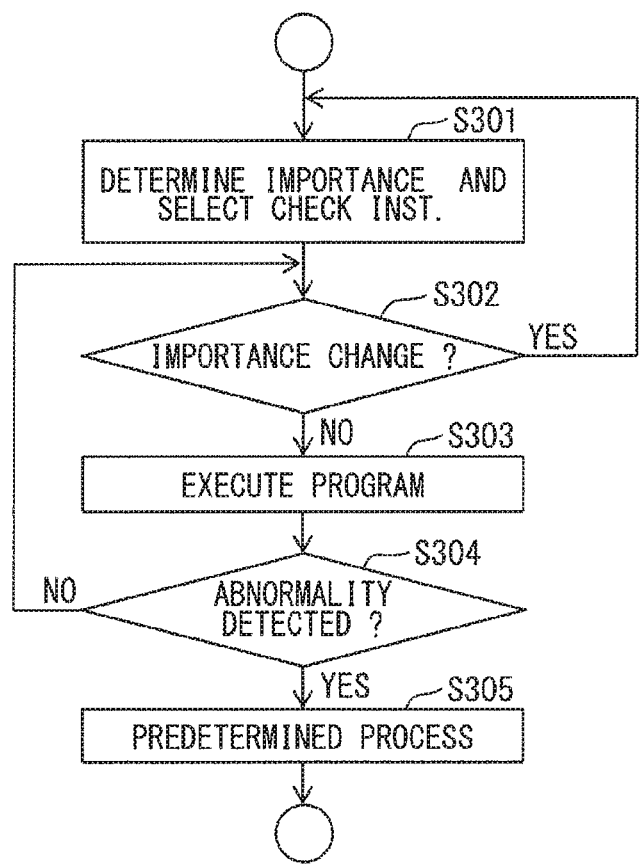
FIG. 12 is a flowchart of an operation of the electronic control unit in the second embodiment of the present disclosure.

Next, operation of the electronic control unit 20 is described with reference to FIG. 12.

The check instruction selector 201 determines the importance based on the information input from the external device, and, based on the determined importance to be checked, selects the check instruction(s) for checking the functions having the relevant importance (S301).

Further, thereafter, after confirming whether the information that causes, or necessitates, the change of the once-determined importance is input from the external device (S302), the check instruction selector 201 returns the process to S301 when such information has been input, to renew the determined importance and newly selects the check instruction(s) based on the renewed importance and with reference to the importance assigned to the functions. If no information input is observed, the arithmetic unit 101 executes the subject program including the selected check instruction(s) (S303). The rest of the flowchart is the same as that of S202 and S203 in FIG. 8.

As mentioned above, the check instruction to be performed is changeable in the present embodiment according to the determined importance at the time of execution of the subject program, thereby (i) reducing the time-related and spatial overhead at the time of program execution and (ii) enabling a situation-dependent program check. For example, depending on the travel environment, such as the travel state of the vehicle and/or the travel location (e.g., road), the control flow to be checked by the check process may be changeable. That is, in view of the effect a program attack may have on a vehicle user, while a HI importance function may only be checked in a low-speed vehicle (e.g., a vehicle traveling at a low rate of speed on a local road), the functions having LO importance or higher may be checked in a high-speed vehicle (e.g., a vehicle traveling at a high rate of speed on an express way). In such manner, safety during the execution of a vehicle control program executed when a vehicle is traveling at a high rate of speed may be improved.

Third Embodiment

According to the second embodiment, the importance of the function in the program code is fixed, and, based on the determination of the importance to be checked, which is made based the information input from the external device, the check instruction is selectively performed with reference to the importance of the function. On the other hand, in the present embodiment, the importance of the function in the program code is changed according to a situation.

1. A Program Generation Method and a Generated Program by Such Method (i.e., Subject Program)

The program generation method of the present embodiment is fundamentally the same as the first embodiment and as the second embodiment described with reference to FIG. 2. However, how the risk rank table is obtained at S102 and the check instruction of S105 are respectively different therefrom.

Figures 13, 14:
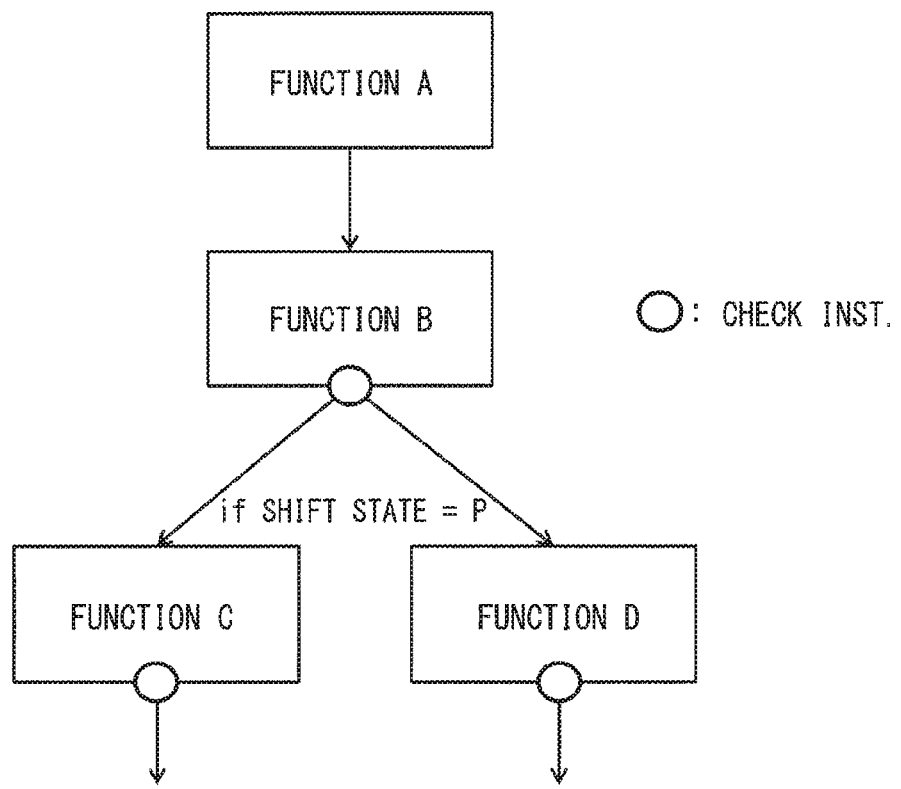
FIG. 13 is a diagram of a risk rank table used in a program generation method in a third embodiment of the present disclosure.
FIG. 14 is an illustration of an insertion step of the program generation method and a configuration of a generated program in the third embodiment of the present disclosure.

FIG. 13 shows a risk rank table used in the present embodiment.

The risk rank table of the present embodiment shows that the importance of the function in the program code changes according to the "operation state" of the vehicle in which the subject program is executed. For example, in the example of FIG. 13, different importance levels are defined respectively for three situations, i.e., for a park time, for a stop time, and for a travel time of the vehicle.

Here, the "operation state" in the present disclosure means not only the state of the vehicle itself, such as a vehicle speed, a gear position, a door lock/unlock and the like, but also means state of operation in the vehicle, such as a brake operation, a steering wheel operation, an accelerator operation and the like, and further means an environmental situation, such a road type, weather, a position of nearby vehicle, and the like.

Then, based on the importance, the check instruction is inserted into the program code. However, since the importance setting is different depending on the operation state in the present embodiment, the check instruction is inserted into the program code, for example, based on the importance of the function in any one of the three operation states, i.e., if at least one of the three operation states corresponds to the instruction insertion requirement, the check instruction is inserted into the program code.

An example of inserting the check instruction when the control flow involving a function having a HI importance in at least one of the three operation states is discussed below. That is, based on the risk rank table of FIG. 13, function C and function D respectively have a HI importance assigned thereto. Therefore, as shown in FIG. 14, the check instruction that checks the control flow involving function C and function D is inserted.

Note that, in the present embodiment similar to the second embodiment, insertion of such instruction may be performed for the control flow involving all functions. The subject program including such a case has already been described above.

2. Electronic Control Unit (ECU) Having the Subject Program

Figure 15:
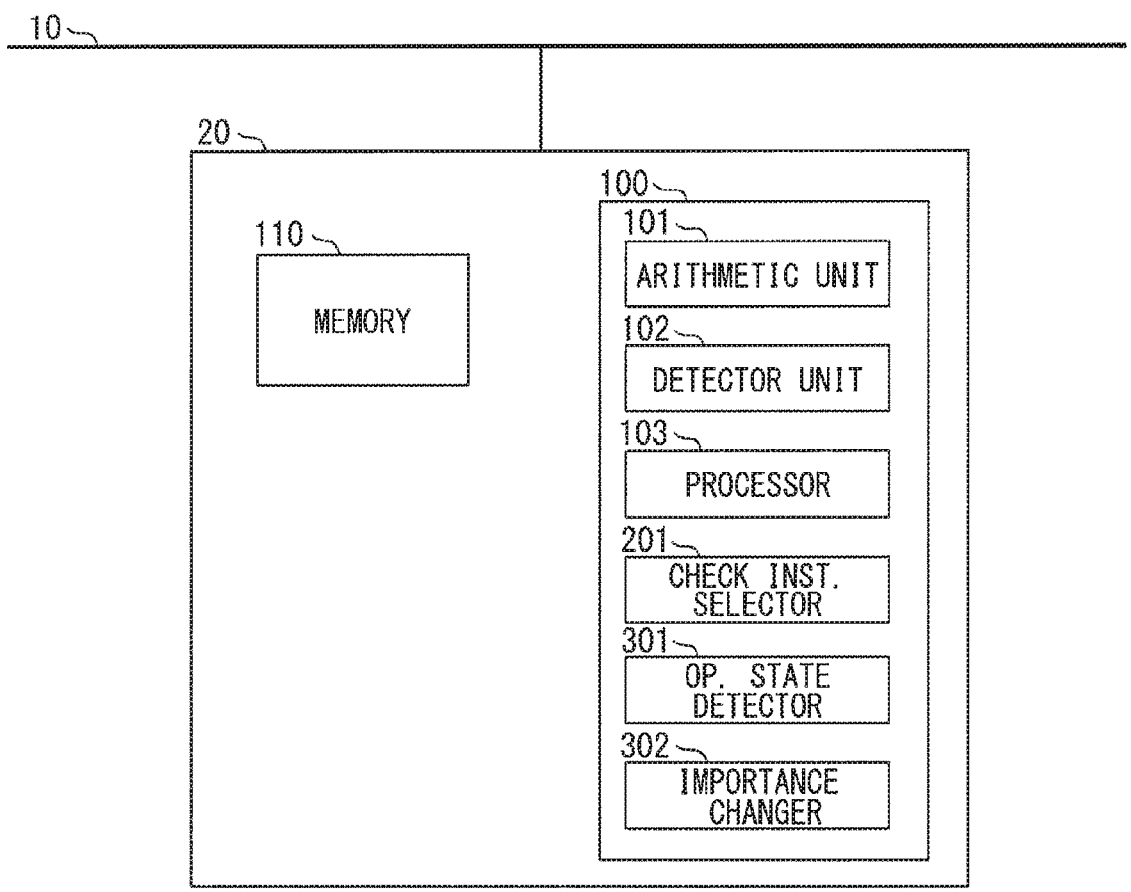
FIG. 15 is a block diagram of an electronic control unit in the third embodiment of the present disclosure.

The configuration of the electronic control unit in the present embodiment is described with reference to FIG. 15. In addition to the configuration of the second embodiment described in FIG. 10, the electronic control unit of the present embodiment has an operation state detector 301 and an importance changer 302. Alternatively, the operation state detector 301 and the importance changer 302 of the present embodiment may be added to the configuration of the first embodiment described in FIG. 7.

The operation state detector 301 receives the operation state of the vehicle detected by a vehicle operation situation obtainer 70 connected to the in-vehicle network 10, and outputs it to the importance changer 302.

The importance changer 302 changes the importance of each function according to the operation state of the vehicle with reference to the risk rank table. Then, the check instruction selector 201 selects, from among the check instructions, a relevant check instruction or instructions to be performed which is/are inserted in the subject program based on the importance of each function based on the determined importance.

In the present embodiment, the check instruction that checks the control flow involving the HI importance function is selected as mentioned below. However, the check instruction may be selected based on firstly determining the importance to be checked as described in the second embodiment. The risk rank table may be stored in the memory 110, but may also be read from the other device connected to the in-vehicle network 10.

Figure 16A:
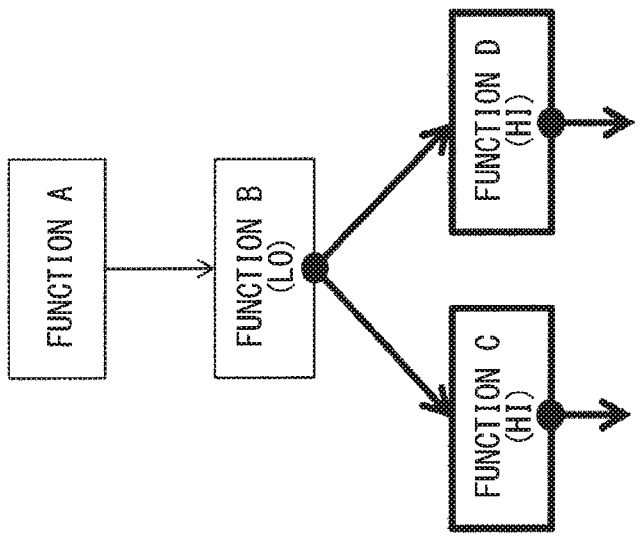
FIG. 16A is an illustration of a configuration of a generated program by the program generation method in the third embodiment of the present disclosure.
Figure 16B:
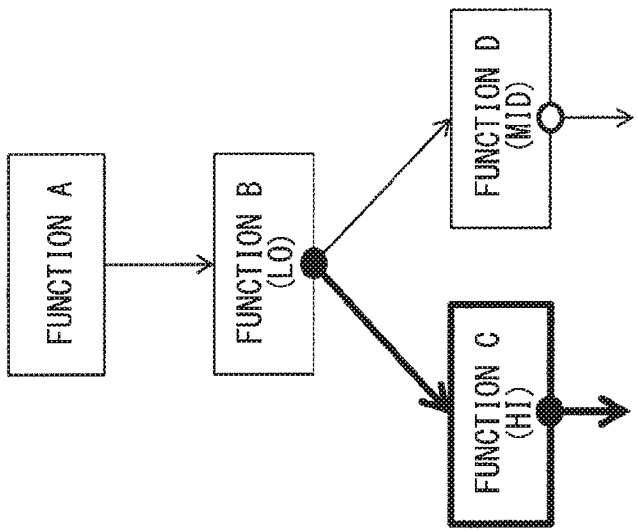
FIG. 16B is another illustration of a configuration of a generated program by the program generation method in the third embodiment of the present disclosure.
Figure 16C:
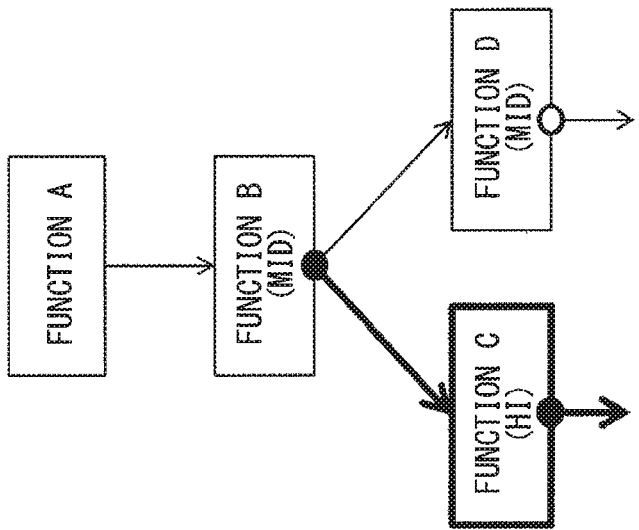
FIG. 16C is yet another illustration of a configuration of a generated program by the program generation method in the third embodiment of the present disclosure.

FIGS. 16A to 16C respectively show the subject program executed based on the risk rank table of FIG. 13. When the operation state detector 301 receives the information that an operation state of the vehicle is a park state, only function C has HI importance (PARK TIME IMPORTANCE in FIG. 13). Therefore, the check instruction selector 201 selects the check instruction that checks only (i) a control flow with a call from function B to function C and (ii) a control flow with a call from function C to another function as shown in FIG. 16A. When the operation state detector 301 receives the information that an operation state of the vehicle is a stop state, only function C has HI importance (STOP TIME IMPORTANCE). Therefore, the check instruction selector 201 selects the check instruction that checks only (i) a control flow with a call from function B to function C and (ii) a control flow with a call from function C to another function as shown in FIG. 16B. When the operation state detector 301 receives the information that an operation state of the vehicle is a travel state, function C and function D respectively have HI importance (TRAVEL TIME IMPOR- TANCE). Therefore, the check instruction selector 201 selects the check instruction that checks the control flow involving function C and function D as shown in FIG. 16C.

Figure 17:
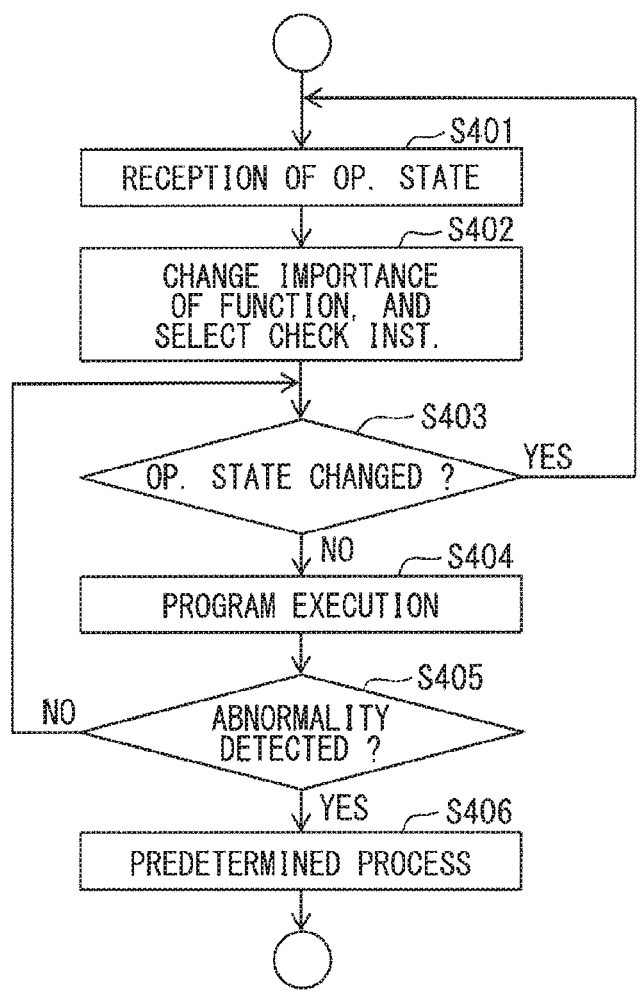
FIG. 17 is a flowchart of an operation of the electronic control unit in the third embodiment of the present disclosure.

Next, operation of the electronic control unit 20 is described with reference to FIG. 17.

The operation state detector 301 receives the operation state of the vehicle detected by the vehicle operation state obtainer 70 connected to the in-vehicle network 10, and outputs it to the importance changer 302 (S401).

The importance changer 302 changes the importance of each function according to the operation state of the vehicle. Then, the check instruction selector 201 selects the check instruction based on the importance of the function, i.e., according to the changed importance (S402).

Then, by confirming whether the operation state is changed thereafter (S403), and, if it is changed, the process returns to S401. If the operation state is not changed, the arithmetic unit 101 executes the subject program including the selected check instruction (S404). The rest of the flowchart is the same as that of S202 and S203 in FIG. 8.

As mentioned above, the check instruction to be performed is changeable in the present embodiment according to the operation state of the vehicle, thereby reducing the time-related and spatial overhead at the time of program execution and enabling an optimal check according to the operation state of the vehicle.

The Fourth Embodiment

The first to third embodiments respectively show, for a proper execution of the control flow, the configuration of insertion of the check instruction into the program code, i.e., the check instruction that checks the ID of a call/return destination function at the time of a call/return of the function is inserted as an instruction for properly performing the control flow.

On the other hand, in the present embodiment, a return instruction, which stores a return address in a secure region and performs a return process based on the return address stored in the secure region, is inserted into the program code, to which the following description is dedicated, with a focus on the difference from the first to third embodiments.

1. A Program Generation Method and a Generated Program by Such Method (i.e., Subject Program)

The program generation method of the present embodiment is fundamentally the same as the first embodiment described with reference to FIG. 2. However, in the present embodiment, a return instruction is inserted into the program code as an instruction, instead of inserting a check instruction.

Figure 18:
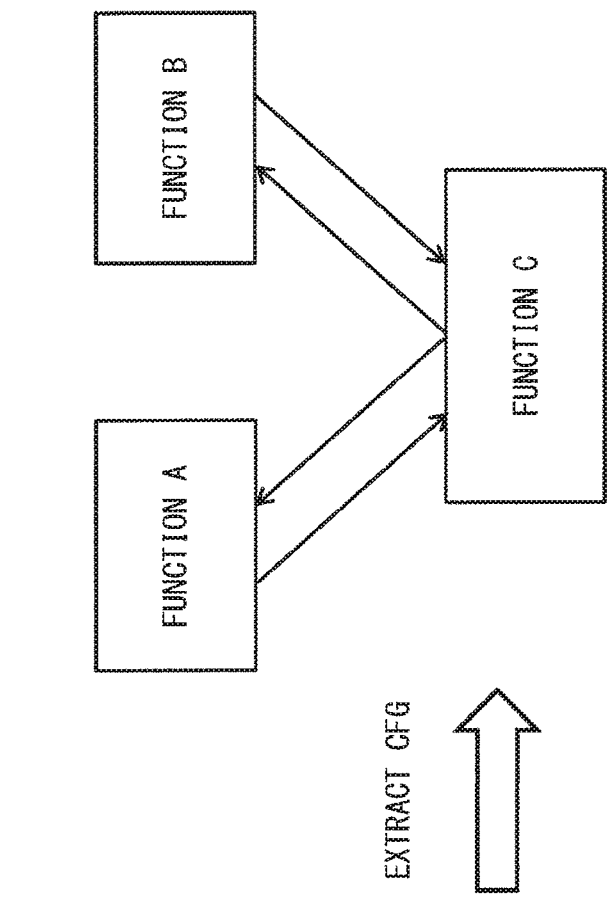
FIG. 18 is an illustration of an extraction step of a program generation method in a fourth embodiment of the present disclosure.

FIG. 18 shows the function and the control flow that are extracted from the program code as a control flow graph (CFG). In an example of FIG. 18, while function A thru function C involving a hazard light ON control are extracted from the program code, the control flow of those functions representing a call/return relationship is extracted, which is different from the control flow of FIG. 3 in that the program code includes a return relationship of the functions. In this example, function A and function C have a call/return relationship, and function B and function C also have a call/return relationship. Further, function A or function B (i.e., the "caller function" in the present disclosure) calls function C (i.e., the "callee function" in the present disclosure), and a control returns from function C to function A or function B, i.e., to a caller function of A or B.

FIG. 19 shows an example of the risk rank table of the present embodiment. From among the extracted functions shown in FIG. 18, function A is a function regarding an emergency braking operation, function B is a function regarding a detection of a hazard switch state, and function C is a function regarding a turning ON (e.g., illumination) of a hazard light. In terms of evaluation of those functions from a viewpoint of influence/effect on the user safety at the time of receiving a program attack from outside the system, causing a call/return other than the normal control flow, the following discussion is applicable.

Function A, which is performed in circumstances where the subject vehicle quickly approaches or moves toward an obstacle such as another vehicle, is configured to have a HI importance, because collision of the subject vehicle with the obstacle (i.e., the other vehicle) without emergency braking possibly causes danger to the vehicle user.

Function B is configured to have a LO importance, because a call of function B (i.e., detection of hazard switch state) somewhere in the control flow may not be noticeable to the vehicle user due to a False (e.g., not true) determination result internally returned to a caller function unless the vehicle user turns ON the hazard switch.

Function C is configured to have a MID importance, because turning ON the hazard light without a manual turn ON operation by the vehicle may annoy or confuse the user, which may lead to user discomfort.

FIG. 20 shows a state in which a function having a preset importance or higher, and a control flow involving such a function are identified, in a CFG of the present embodiment. In the illustration, a thick frame rectangle is a function having a preset importance or higher, and a thick line arrow is a control flow returning to the function having a preset importance or higher.

In the present embodiment, a function having a HI importance and a control flow returning to such function, are identified. That is, function A is the only function having a HI importance in the present embodiment, a control flow returning from function C to function A is identified.

Subsequently, similar to the first embodiment, a return instruction is inserted into a program code regarding the control flow identified as having a preset importance or higher.

FIG. 21 shows an illustration of a CFG, in which the return instruction is inserted into a program. In the present embodiment, the return instruction for properly performing the control flow that returns to function A having a HI importance is inserted into the program code.

Further, just like the first embodiment, the subject program that has the program code in which the return instruction is inserted is written in the electronic control unit 20 for the implementation of the program.

When a return instruction is performed, i.e., when function A calls function C, the instruction stores a return address for returning from function C to function A in a "secure region". Then, the instruction performs a return process from function C to function A "based on" the return address stored in the secure region. More specifically, the instruction performs the return process to the return address stored in the secure region. In the present embodiment, an example that stores a return address in a secure region when function A calls function C is described.

The "secure region" in the above context may be an area/region of a memory where the security of the stored data is secured and guaranteed, which may be an access-controlled and/or restricted memory area that enforces access control (e.g., threading and writing) of the stored data (i.e., "secure region" in a strict sense), or may also be a shadow stack region. The "secure region" may be located in a random access memory (RAM) or in a read-only memory (ROM). The "shadow stack region" may be a memory area/region separated from a memory area/region that is accessible normally at the time of the program execution. That is, for example, it includes a data region of an expanded segment to be accessed by explicitly specifying a memory address. Further, "based on" in the above context means that a return address of a return process is determined at least by using a return address stored in the secure region, which may further be paraphrased as a direct use of the secure-region stored return address itself or as determination of a return address in consideration of other factors besides using the secure-region stored return address.

Normally, when function A calls another function such as function C, a return process to return to function A is performed to a return address stored in a stack region, i.e., by storing the return address in such region. However, during a buffer overflow attack, the return address written in the stack region is overwritten to a memory address that stores a malicious code. In other words, when a return address for returning from function C is overwritten to point to function B, the check instruction cannot really detect such an overwriting, i.e., the altered control flow due to such overwriting is not detectable solely by the check instruction. Therefore, the control flow having the return instruction inserted therein stores the return address in the secure region, which is protected from the external attacks and/or access, for enabling a secure return to a return address that points to a legitimate caller function.

As for the data stored in the secure region, high level security is provided to access the data from the external device. For example, in order to access the shadow stack region, which is a secure region, a register must explicitly be specified. That is, in other words, the shadow stack region is not read or written at the time of normal program execution, thereby serving as an effectively protected area/region against the buffer overflow attack. Thus, the return address stored in the secure region is a guaranteed value. On the other hand, use of the secure region for the storage of a return address increases the overhead.

However, according to the program generation method described above, due to the limitation on (i) the use of the secure region for the storage of the return address and (ii) the frequency of use of the secure region based on the importance, safety of the return process may be improved, while reducing an increase of the overhead.

2. Electronic Control Unit (ECU) Having the Subject Program

Figure 7:
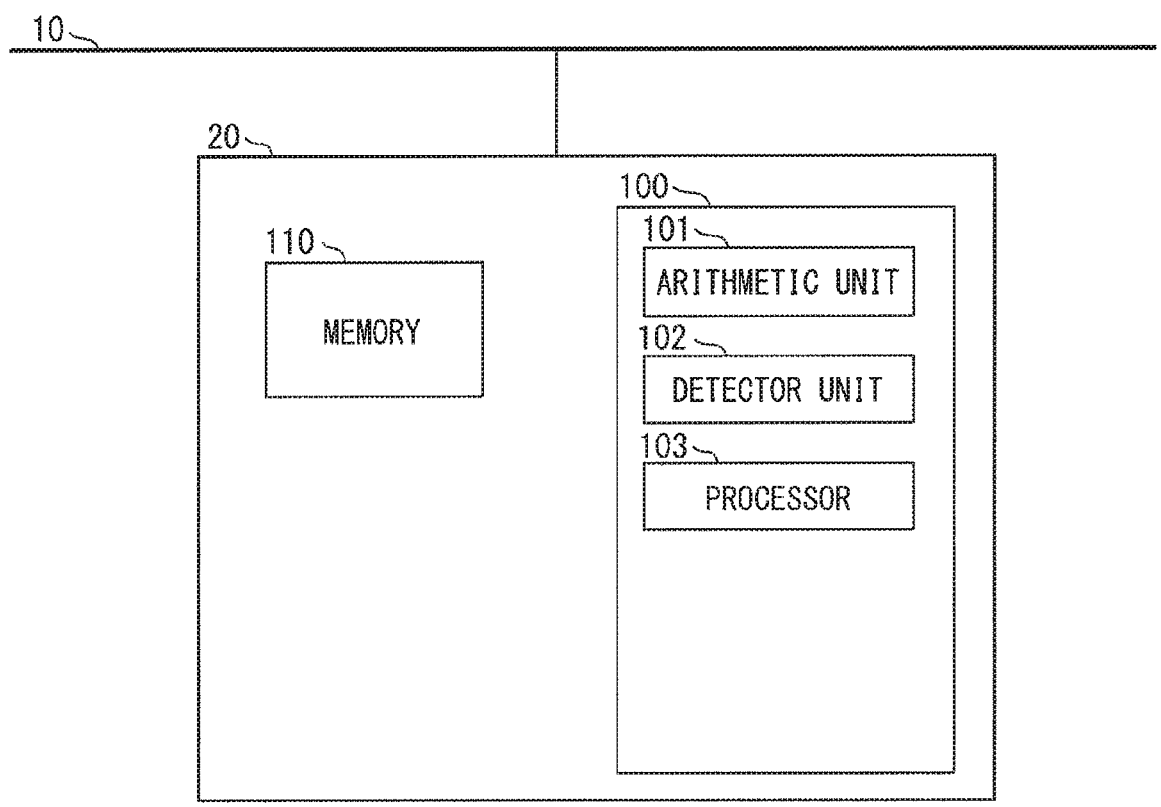
FIG. 7 is a block diagram of the electronic control unit in the first embodiment of the present disclosure.

The subject program generated in the above is implemented to, or used in, the electronic control unit 20 as shown in FIG. 7, just like the first embodiment. However, as mentioned below, the detector unit 102 and the processor 103 may be dispensable from the electronic control unit 20 having the subject program. Note that the secure region and the stack region are provided in the memory 110.

Figure 22:
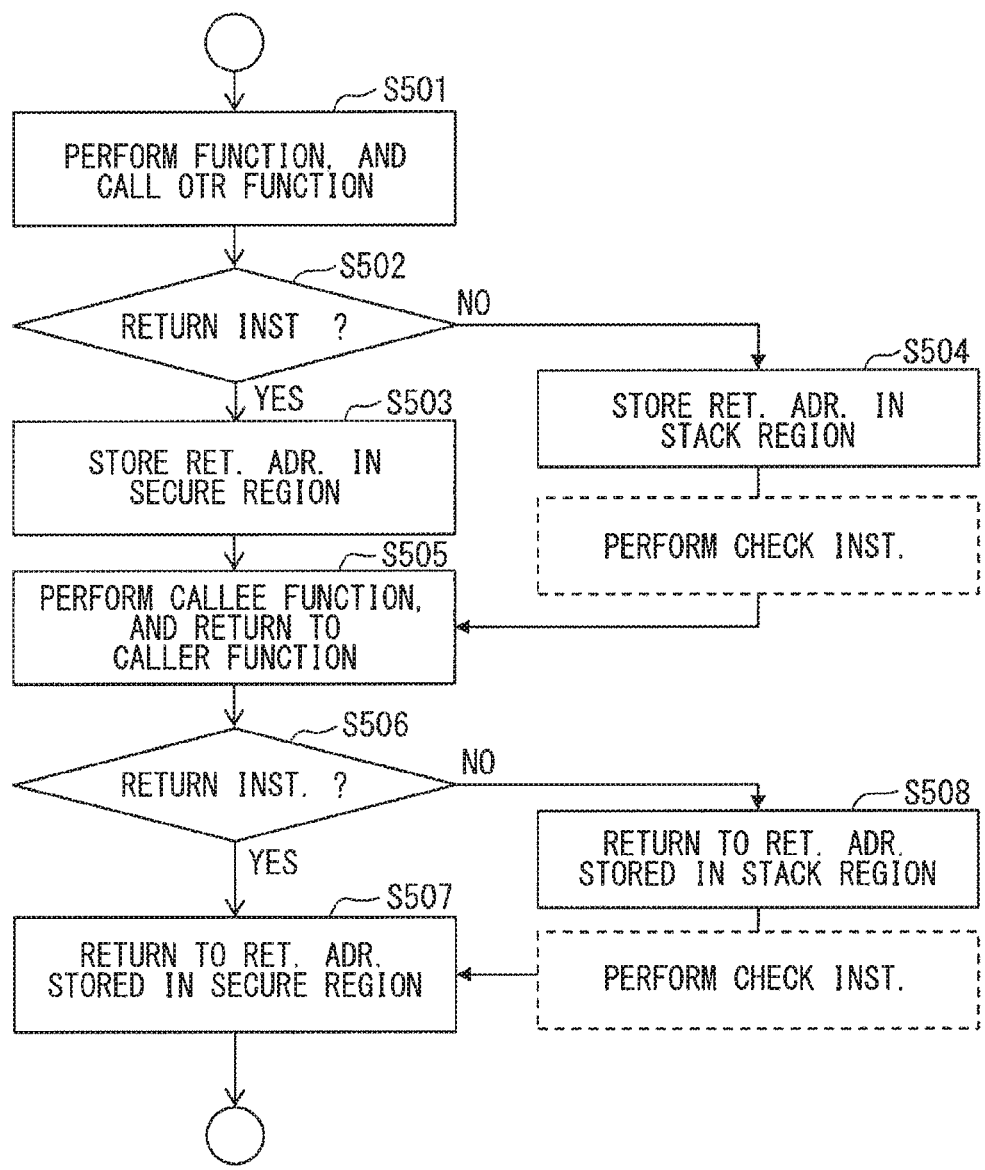
FIG. 22 is a flowchart of an operation of the electronic control unit in the fourth embodiment of the present disclosure.

Next, the operation of the electronic control unit 20 at the time of the program execution is described with reference to FIG. 22.

The arithmetic unit 101 of the CPU reads the subject program stored in the memory 110, and starts an execution of the program.

First, a function (i.e., function A or function B in FIG. 21) in the program code is performed, then, a call for another function (i.e., function C) is performed (S501). In case that a return instruction is inserted, a return address is stored in the secure region (S502, S503). On the other hand, when the return instruction is not inserted, a return address is stored in the stack region as usual (S502, S504). As an application of the present (i.e., fourth) embodiment, when not performing a return instruction, a check instruction may be performed after S504, as shown by a broken line in FIG. 22.

Next, a callee function (i.e., function C) is performed, and a control returns to the caller function (i.e., function A or function C) (S505). In case that a return instruction is inserted, a return process is performed to return to the return address stored in the secure region (S506, S507). On the other hand, in case that the return instruction is not inserted, a return process is performed to return to the return address stored in the stack region (S506, S508). In this case as well, as an application of the present (i.e., fourth) embodiment, when not performing a return instruction, a check instruction may be performed after S508, as shown by the broken line in FIG. 22.

Note that, in the present (i.e., fourth) embodiment, the return address is stored in the secure region, and the return process is performable to return to a correct and legitimate return address, unlike the first through third embodiments, the detector unit 102 that detects an abnormality of the control flow and the processor 103 that performs a predetermined process in cases of abnormality detection by the detector unit 102 are not required.

The return instruction in the above-mentioned embodiments reads the return address stored in the secure region, and performs the return process to return to the return address. However, the return instruction may be performed at least "based on" the return address stored in the secure region, which means that the return address stored in the secure region may further undergo a security check.

The return address is normally stored in the stack region, when one function calls the other function, as mentioned above. Thus, when returning from one function to the caller function, the return instruction may perform the return process to a "matching" return address, by comparing the return address (i.e., the "first return address" in the present disclosure) stored in the secure region with the return address (i.e., the "second return address" in the present disclosure) stored in the stack region upon detecting a match between the two addresses.

That is, when the return instruction is configured to examine an address matching, i.e., to perform a comparison between the return address stored in the secure region and the return address stored in the stack region, while the return process is securely performable to the correct and legitimate return address, an abnormality detection detecting a modification/tampering of the second return address may also be enabled.

3. Modifications of the Fourth Embodiment (Modification 1)

The return instruction of the present (i.e., fourth) embodiment, may be configured, when the return instruction is inserted, to always store the return address in the secure region and always perform the return process to the return address stored in the secure region, similar to the check instruction described in the first embodiment.

However, the return instruction may be configured to selectively perform the return process based on the importance of the functions during the execution of the subject program, similar to the check instruction described in the second embodiment. In such case, when generating the subject program, the functions in the program having a LO importance or higher are identified, the control flow(s) involving the identified (i.e., LO or higher importance) functions is/are identified, and the return instruction(s), which guarantee proper return of the identified (i.e., LO or higher importance) functions, is/are inserted into the program code. Further, while the configuration of the electronic control unit of the present modification (i.e., modification 1) is fundamentally the same as the one shown in FIG. 10, it is further provided with a return instruction selector, instead of having the check instruction selector 201.

For example, during a normal travel of the vehicle, the return instruction selector selects a return instruction that stores the return address of function A having a HI importance in the secure region, and another return instruction that performs a return process based on the return address stored in the secure region as shown in FIG. 23A.

On the other hand, during a high speed travel of the vehicle, the return instruction selector selects, as shown in FIG. 23B, a return instruction or instructions involving the functions having a LO importance or higher as a target of processing.

In the present modification (i.e., modification 1), the return instruction to be performed is changeable according to the importance for improving the safety of the return process for the functions in view of a situation (e.g., traffic situation around the vehicle), while preventing and/or limiting an increase in overhead due to the use of the secure region.

Further, when not performing the return instruction, the increase in overhead may more efficiently be prevented and/or limited by invalidating the secure region that stores the return address.

(Modification 2)

The return instruction described in the fourth embodiment may be configured to dynamically change the target of instruction by changing the importance of the function(s) in the program code depending on/according to the situation, similar to the configuration of the check instruction in the third embodiment. In such case, while the configuration of the electronic control unit is fundamentally the same as the one shown in FIG. 15, the check instruction selector 201 is replaced with the return instruction selector.

FIG. 24 shows an example of the risk rank table used in the present embodiment, in which the importance changes according to a situation. For example, when the operation state detector 301 receives that the operation state of the vehicle is in a high speed travel state, the importance changer 302 changes the importance of function A and function C to HI, while changing the importance of function B to MID, respectively. Then, the return instruction selector selects a return instruction that stores the return address of function A and function C having a HI importance or higher in the secure region, and another return instruction that performs the return process based on the return address stored in the secure region as a target of processing.

On the other hand, when the operation state detector 301 receives that the operation state of the vehicle is in a low speed travel state, the importance changer 302 changes the importance of function A and function C to MID, while changing the importance of function B to LO, respectively. Then, the return instruction selector does not select a return instruction as a target of processing for function A or C.

In the present modification (i.e., modification 2), the return instruction to be performed is changeable according to the importance for optimally improving the safety of the return process of the functions in view of the operation state of the vehicle, while preventing and/or limiting an increase in overhead due to the use of the secure region.

Further, similar to the modification 1, when not performing the return instruction, the increase in overhead may be more efficiently prevented by invalidating the secure region that stores the return address.

Other Embodiments

Although the subject program itself written in the electronic control unit 20 is not changed in the first to fourth embodiments, rewriting/overwriting of the subject program itself may be performed. For example, the insertion position of the instruction may be changed according to the use situation or the operation state of the vehicle. Further, the insertion position of the instruction may be changed according to the frequency of use of the function to be performed.

Summary

As described above, the features regarding the program generation method, the electronic control unit, and the subject program generated by the program generation method are described in each of the embodiments of the present disclosure.

Further, the features in different embodiments may be combined to provide yet different embodiment(s). That is, combination of two or more embodiments, either in part or as a whole, may be permissible unless otherwise noted. For example, by combining the second and third embodiments, the check instruction to be performed may be made selectable, while the importance of the functions may be changed.

The first to third embodiments respectively describe a configuration that the check instruction is inserted into the program code as an instruction, and the fourth embodiment describes a configuration that the return instruction is inserted into the program code as an instruction.

Further, an instruction may include at least one of the check instruction and the return instruction, and may include both of the check instruction and the return instruction. For example, for a function having a HI importance, both of the check instruction and the return instruction may be performed. Alternatively, when both of the check instruction and the return instruction are inserted, the return instruction may be preferentially performed, and the check instruction may only be performed for the functions into which the return instruction is not inserted.

The configuration of the present disclosure in each of the embodiments as well as the methods thereof may be combinable at an element level. In other words, the elements of the disclosure in one embodiment may not be necessarily indispensable, and thereby respective elements may be reorganized differently.

INDUSTRIAL APPLICABILITY

Although the present disclosure is mainly usable in or applicable to the electronic control unit in the automobile, it may also be usable in other vehicles, such as a motor cycle (i.e., two-wheel vehicle), an electric bicycle, as well as a marine vessel, an airplane, and the like. The above-mentioned examples do not limit the applicability of the present disclosure only to vehicles.

That is, it is to be noted that various changes and modifications will become apparent to those skilled in the art, and such changes, modifications, and summarized schemes are to be understood as being within the scope in the present disclosure as defined by appended claims.

What is claimed is:

1. A program generation method for modifying a program code before writing the modified program code to an electronic control unit (ECU), the program generation method comprising:
before writing modified program code to the ECU:
extracting a control flow that represents a call-return relationship between functions as well as extracting the functions themselves from a program code;
determining a predetermined importance of a user safety corresponding to each of the extracted functions, wherein the predetermined importance is determined based on a risk ranking table that indicates, for respective callable functions, the predetermined importance of an impact of a callable function on the user safety; and
inserting a check instruction into high-importance functions among the control flows of the identified functions in the program code upon a determination that a predetermined importance of at least one of the extracted functions exceeds an importance threshold, as modified program code executable by the ECU, to perform the control flow based on the predetermined importance of the user safety corresponding to each of the extracted functions.

2. The program generation method of claim 1, further comprising:
writing the modified program code into an ECU disposed in a vehicle.

3. The program generation method of claim 1, further comprising:
writing the modified program code into an ECU disposed in a vehicle; and
executing, by the ECU, the modified program code written in the ECU.

4. The program generation method according to claim 1, further comprising:
writing the modified program code into an electronic control unit that is installed in a vehicle, and
changing the predetermined importance of the check instruction in the modified program code in the electronic control unit according to an operation state of the vehicle.

5. The program generation method of claim 1, wherein the check instruction checks whether the program code is executable based on the extracted control flow.

6. The program generation method of claim 1, wherein the program code includes
a caller function and,
a callee function that is called by the caller function and returns control to the caller function, and
the check instruction includes a return instruction that (i) stores a return address from the callee function to the caller function in a secure region and (ii) performs a return process to return from the callee function to the caller function based on the stored return address.

7. The program generation method of claim 6, wherein the return instruction performs the return process that returns to the return address stored in the secure region.

8. The program generation method of claim 6, wherein the return instruction compares a first return address and a second return address, the first return address stored in the secure region and the second return address stored in a stack region when the caller function calls the callee function for returning from the callee function to the caller function, and performs the return process to return to the first return address or the second return address upon determining a match between the first return address and the second return address.

9. The program generation method of claim 1, wherein the predetermined importance of the user safety corresponding to each of the extracted functions is further determined based on frequency of use of the extracted functions.

10. The program generation method of claim 1, wherein the program code is written in an electronic control unit disposed in a vehicle, and
the predetermined importance of the user safety corresponding to each of the extracted functions is determined according to a safety of a vehicle user when the extracted functions are relevant to the safety of the vehicle user.

11. The program generation method of claim 1, wherein the check instruction is configured to be selectively performable based on the predetermined importance of the user safety corresponding to each of the extracted functions.

12. An electronic control unit comprising:
a memory; and
an arithmetic unit configured to perform a program that has a check instruction inserted into high-importance functions among control flows of identified functions in a program code as modified program code executable by the electronic control unit, before writing the modified program code to the electronic control unit, based on a determination that a predetermined importance of a user safety corresponding to at least one of functions extracted from the program code exceeds an importance threshold, wherein the predetermined importance is determined based on a risk ranking table that indicates, for respective callable functions, the predetermined importance of an impact of a callable function on the user safety, for performing a control flow that represents a call-return relationship of the function written in the program code.

13. The electronic control unit of claim 12, wherein the program code is written to the electronic control unit installed in a vehicle, and
the electronic control unit further includes:
an operation state detector configured to receive an operation state of the vehicle; and
an importance changer configured to change the importance of the function written in the program code according to the detected operation state.

14. The electronic control unit of claim 12, wherein the check instruction checks whether the program code is executable based on the control flow, and
the electronic control unit further includes:
a detector unit configured to detect an abnormality of the control flow by monitoring an output of the check instruction; and
a processor configured to perform a predetermined process based on a detection result of the processor.

15. The electronic control unit of claim 12, wherein the program code includes
a caller function, and
a callee function that is called by the caller function and returns control to the caller function, and
the check instruction includes a return instruction that (i) stores a return address from the callee function to the caller function in a secure region and (ii) performs a return process to return from the callee function to the caller function based on the stored return address.

16. The electronic control unit of claim 15, wherein the return instruction performs the return process that returns to the return address stored in the secure region.

17. The electronic control unit of claim 15, wherein the return instruction compares a first return address and a second return address, the first return address stored in the secure region and the second return address stored in a stack region when the caller function calls the callee function for returning from the callee function to the caller function, and performs the return process to return to the first return address or the second return address upon determining a match between the first return address and the second return address.

18. The electronic control unit of claim 15, wherein the return instruction performs the return process that returns to the return address stored in the secure region.

19. The electronic control unit of claim 15, wherein the return instruction compares a first return address and a second return address, the first return address stored in the secure region and the second return address stored in a stack region when the caller function calls the callee function for returning from the callee function to the caller function, and performs the return process to return to the first return address or the second return address upon determining a match between the first return address and the second return address.

20. The electronic control unit of claim 15, wherein the predetermined importance of the user safety corresponding to at least one of the functions is further determined based on frequency of use of the functions.

21. The electronic control unit of claim 12, wherein the program code is written in the electronic control unit disposed in a vehicle, and the predetermined importance of the user safety corresponding to at least one of the functions is determined according to a safety of a vehicle user when the functions are relevant to the safety of the vehicle user.

22. An electronic control unit comprising:
a memory;
an arithmetic unit configured to perform a program that has a check instruction inserted into high-importance functions among control flows of identified functions in a program code as modified program code executable by the electronic control unit, before writing the modified program code to the electronic control unit, based on a determination that a predetermined importance of a user safety corresponding to at least one of functions extracted from the program code exceeds an importance threshold, wherein the predetermined importance is determined based on a risk ranking table that indicates, for respective callable functions, the predetermined importance of an impact of a callable function on the user safety, for performing a control flow that represents a call-return relationship of the functions written in the program code, wherein the check instruction inserted in the program code is selectively performed based on a predetermined importance of the functions; and
an instruction selector configured to select, at execution time, the check instruction to be performed based on the predetermined importance of the functions.

23. The electronic control unit of claim 22, wherein the check instruction checks whether the control flow is performable, which is selectively performable based on the predetermined importance of the functions, and the electronic control unit further includes:
a detector unit configured to detect an abnormality of the control flow by monitoring an output of the check instruction; and
a processor configured to perform a predetermined process based on a detection result of the processor.

24. The electronic control unit of claim 22, wherein the program code includes a caller function and a callee function that is called by the caller function and returns control to the caller function, and the check instruction includes a return instruction that (i) stores a return address from the callee function to the caller function in a secure region and (ii) performs a return process to return from the callee function to the caller function based on the stored return address.

25. The electronic control unit of claim 22, wherein the program code is written in the electronic control unit disposed in a vehicle, and the electronic control unit further includes:
an operation state detector configured to receive an operation state of the vehicle; and
an importance changer configured to change the predetermined importance of the functions according to the detected operation state detected by a vehicle operation state obtainer.

26. A non-transitory physical computer-readable medium comprising instructions being executed by a computer, the instructions including a computer-implemented method for modifying a program code before writing the modified program code to an electronic control unit (ECU), the method including:
before writing modified program code to the ECU:
extracting a control flow representing a call-return relationship between functions as well as extracting the functions themselves from a program code;
determining from an instruction in the program code a predetermined importance of a user safety corresponding to each of the extracted functions, wherein the predetermined importance is determined based on a risk ranking table that indicates, for respective callable functions, the predetermined importance of an impact of a callable function on the user safety; and
inserting a check instruction into high-importance functions among the control flows of the identified functions in the program code upon a determination that a predetermined importance of at least one of the extracted functions exceeds an importance threshold, as modified program code executable by the ECU, to perform the control flow based on the predetermined importance of the user safety corresponding to each of the extracted functions.

27. The non-transitory physical computer-readable medium of claim 26, wherein the method further includes selectively performing the check instruction based on the predetermined importance of the user safety corresponding to each of the extracted functions.

28. The non-transitory physical computer-readable medium of claim 26, wherein the method further includes checking whether the control flow is performable based on the check instruction in the instructions.

29. The non-transitory physical computer-readable medium of claim 26, wherein the program code includes a caller function and a callee function, and wherein the method further includes:

calling a callee function by the caller function;
returning control to the caller function;
storing a return address from the callee function to the caller function in a secure region based on a return instruction in the check instruction; and
returning from the callee function to the caller function based on the stored return address.

30. The non-transitory physical computer-readable medium of claim 29, wherein the return instruction includes performing the return process that returns to the return address stored in the secure region.

31. The non-transitory physical computer-readable medium of claim 29, wherein the return instruction includes
comparing a first return address stored in the secure region and a second return address stored in a stack region when the caller function calls the callee function for returning from the callee function to the caller function; and
returning to the first return address or the second return address upon determining a match between the first return address and the second return address.

32. A program generator that modifies a program code before writing the modified program code to an electronic control unit (ECU), the program generator comprising:

a processor;
a non-transitory computer-readable memory storing instructions that, when executed, cause the following to be performed:
extract callable functions and control flows from a program;
obtain a risk ranking table that indicates, for respective callable functions, a predetermined importance of an impact of a callable function on a user safety;
determine the predetermined importance of the user safety corresponding to each of the extracted callable functions, wherein the predetermined importance is determined based on the risk ranking table;
identify the extracted callable functions having at least a preset importance of the user safety, and identify the control flows of the identified functions;
insert check instructions into high-importance functions among the control flows of the identified functions in the program code, as modified program code executable by the ECU, in at least one of: an end of a calling function that calls the identified function, and an end of the identified function; and
store the modified program code executable by the ECU, including inserted check instructions.

\* \* \* \* \*